US012775825B1

(12) United States Patent
Alperin

(10) Patent No.: US 12,775,825 B1
(45) Date of Patent: Oct. 27, 2026

(54) APPARATUS AND METHOD FOR ARTIFICIAL INTELLIGENCE (AI) GENERATED DATUM VALIDATION

(71) Applicant: SurvivorNet, Inc., New York, NY (US)

(72) Inventor: Steven David Alperin, New York, NY (US)

(73) Assignee: SurvivorNet, Inc., New York, NY (US)

( * ) Notice: Subject to any disclaimer, the term of this patent is extended or adjusted under 35 U.S.C. 154(b) by 0 days.

(21) Appl. No.: 19/191,186

(22) Filed: Apr. 28, 2025

(51) Int. Cl.
*G06N 3/0455* (2023.01)

(52) U.S. Cl.
CPC .................................. *G06N 3/0455* (2023.01)

(58) Field of Classification Search
CPC .................................................... G06N 3/0455
See application file for complete search history.

(56) References Cited

U.S. PATENT DOCUMENTS

| | | | | |
|---|---|---|---|---|
| 12,381,008 | B1 * | 8/2025 | Barve | G16H 50/20 |
| 2018/0322942 | A1 * | 11/2018 | Stankiewicz | G16H 20/60 |
| 2021/0134301 | A1 * | 5/2021 | Yang | G10L 15/075 |
| 2021/0249132 | A1 * | 8/2021 | Colborn | G16H 50/30 |
| 2022/0130516 | A1 * | 4/2022 | Levy | G16H 50/20 |
| 2022/0147867 | A1 | 5/2022 | Rakshit et al. | |
| 2022/0172837 | A1 | 6/2022 | Pagi et al. | |
| 2023/0148321 | A1 | 5/2023 | Hall et al. | |
| 2024/0242339 | A1 | 7/2024 | Grbic | |
| 2025/0111212 | A1 * | 4/2025 | Tomut | G06N 3/0495 |
| 2025/0272577 | A1 * | 8/2025 | Thompson | G06F 16/33295 |
| 2025/0336401 | A1 * | 10/2025 | Albasiri | G10L 15/26 |

OTHER PUBLICATIONS

Li C, Liu X, Zhang Z, Wang Y, Liu C, Lan Y, Shen C. Concentrate Attention: Towards Domain-Generalizable Prompt Optimization for Language Models. Advances in Neural Information Processing Systems. Dec. 16, 2024;37:3391-420. (Year: 2024).*

Hu B, Huang Z, Hu M, Zhang Z, Dou Y. Adaptive threshold selective self-attention for Chinese NER. InProceedings of the 29th International Conference on Computational Linguistics Oct. 2022 (pp. 1823-1833). (Year: 2022).*

* cited by examiner

*Primary Examiner* — Oluwatosin Alabi
(74) *Attorney, Agent, or Firm* — CALDWELL LLC

(57) ABSTRACT

An apparatus for validating AI generated data includes a processor and a memory containing instructions that configure the processor to receive an AI generated datum produced by an AI model. The apparatus retrieves validated data correlated to the AI generated datum, where the validated data meets specific validation conditions. A validation AI agent, trained with historical AI generated data and corresponding validated data, is employed to validate the AI generated datum. The validation AI agent matches the AI generated datum to at least one datum within the validated data, generates a confidence score based on this match, and validates the AI generated datum using the confidence score. The validated AI generated datum is then output based on the validation.

18 Claims, 10 Drawing Sheets

APPARATUS AND METHOD FOR ARTIFICIAL INTELLIGENCE (AI) GENERATED DATUM VALIDATION

FIELD OF THE INVENTION

The present invention generally relates to the field of artificial intelligence. In particular, the present invention is directed to an apparatus and method for artificial intelligence generated datum validation.

BACKGROUND

In recent years, the proliferation of artificial intelligence (AI) technologies has led to the development of various systems and methods for generating data using AI models. These AI generated data are often used in diverse applications, ranging from natural language processing to image recognition. However, ensuring the accuracy and reliability of AI generated data has been a significant challenge. Traditional approaches have relied on manual validation processes, where human experts review and verify the data. This method, while effective, is time-consuming and prone to human error, especially when dealing with large volumes of data.

To address these challenges, some systems have incorporated automated validation techniques that utilize rule-based algorithms. These systems apply predefined rules to assess the validity of AI generated data. While rule-based systems can process data more quickly than manual methods, they often lack the flexibility to adapt to new types of data or evolving validation criteria. Additionally, rule-based systems may struggle to handle complex data patterns that do not conform to straightforward rules, leading to potential inaccuracies in validation. However, none of these approaches have provided a comprehensive solution that effectively addresses the challenges.

SUMMARY OF THE DISCLOSURE

In an aspect, the techniques described herein relate to an apparatus for artificial intelligence (AI) generated datum validation, the apparatus including: at least a processor; and a memory communicatively connected to the at least a processor, wherein the memory contains instructions configuring the at least a processor to: receive an AI generated datum, wherein the AI generated datum is generated using an AI model; retrieve validated data from a validated database as a function of the AI generated datum, wherein the validated data is data that has been validated to meet validation conditions; validate the AI generated datum as a function of the validated data using a validation AI agent, wherein the validation AI agent is trained with validated training data, wherein the validated training data includes historical AI generated datum correlated to historical validated data; and wherein the validation AI agent is configured to: match the AI generated datum to at least a datum of the validated data; generate a confidence score of the AI generated datum based on the at least a matched datum of the validated data; and validate the AI generated datum as a function of the confidence score; and output the AI generated datum based on the validation.

In another aspect, the techniques described herein relate to a method for artificial intelligence (AI) generated datum validation, the method including: receiving, using at least a processor, an AI generated datum, wherein the AI generated datum is generated using an AI model; retrieving, using the at least a processor, validated data from a validated database as a function of the AI generated datum, wherein the validated data is data that has been validated to meet validation conditions; matching, using the at least a processor and a validation AI agent, the AI generated datum to at least a datum of the validated data, wherein the validation AI agent is trained with validated training data, wherein the validated training data includes historical AI generated datum correlated to historical validated data; generating, using the at least a processor and the validation AI agent, a confidence score of the AI generated datum based on the at least a matched datum of the validated data; validating, using the at least a processor and the validation AI agent, the AI generated datum as a function of the confidence score; and outputting, using the at least a processor, the AI generated datum based on the validation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for artificial intelligence (AI) generated datum validation. The apparatus includes at least a processor; and a memory communicatively connected to the at least a processor, wherein the memory contains instructions configuring the at least a processor to: receive an AI generated datum, wherein the AI generated datum is generated using an AI model; retrieve validated data from a validated database as a function of the AI generated datum, wherein the validated data is data that has been validated to meet validation conditions; validate the AI generated datum as a function of the validated data using a validation AI agent, wherein the validation AI agent is trained with validated training data, wherein the validated training data includes historical AI generated datum correlated to historical validated data; and wherein the validation AI agent is configured to: match the AI generated datum to at least a datum of the validated data; generate a confidence score of the AI generated datum based on the at least a matched datum of the validated data; and validate the AI generated datum as a function of the confidence score; and output the AI generated datum based on the validation. Exemplary embodiments illustrating aspects of the present disclosure are described below in the context of several specific examples.

Figure 1A:
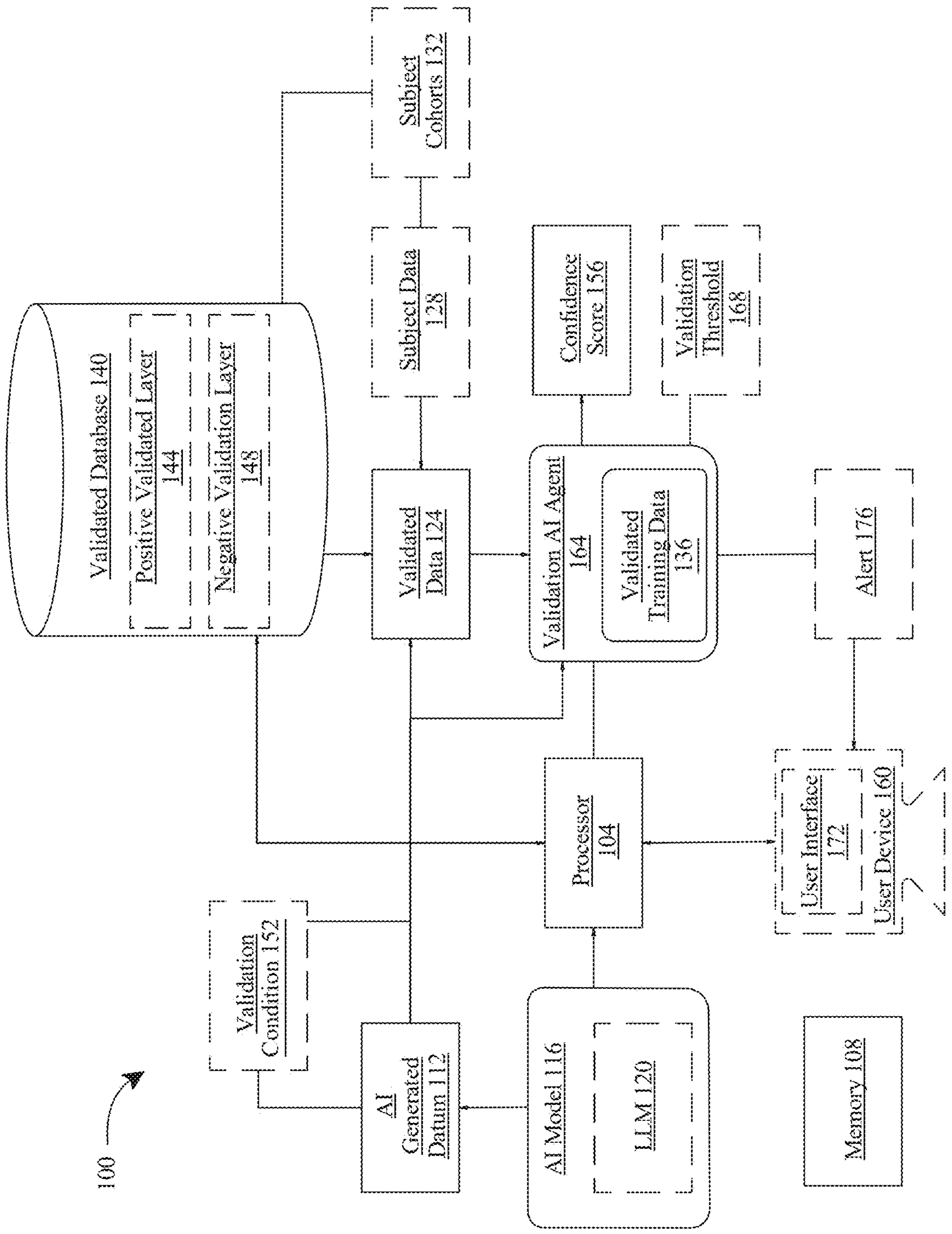
FIGS. 1A-B illustrate a block diagram of an exemplary apparatus for artificial intelligence (AI) generated datum validation.
Figure 1B:
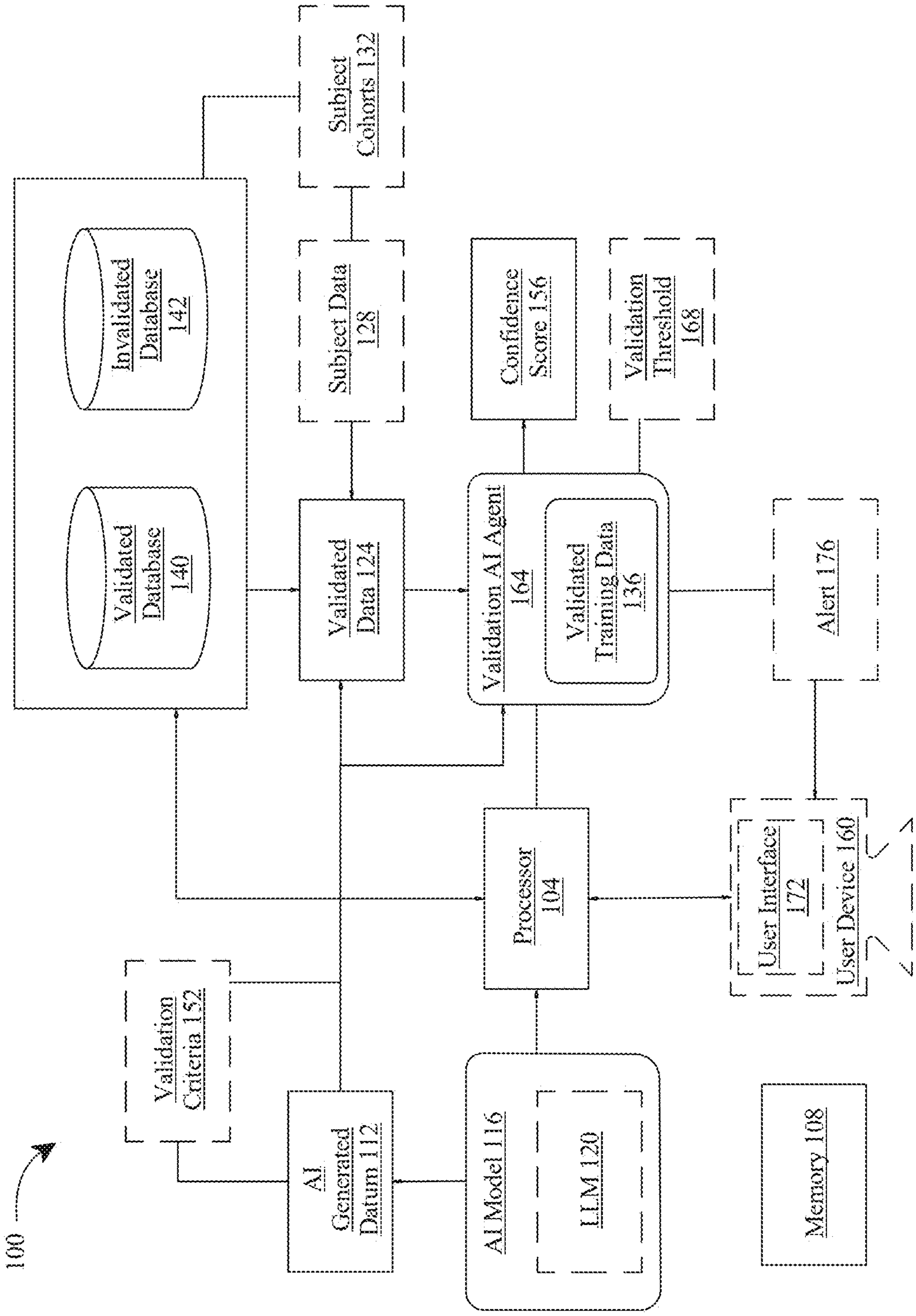

Referring now to FIGS. 1A-B, exemplary embodiments of an apparatus 100 for artificial intelligence (AI) generated datum validation are illustrated. Apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIGS. 1A-B, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIGS. 1A-B, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIGS. 1A-B, memory 108 contains instructions configuring processor 104 to receive an AI generated datum 112. For the purposes of this disclosure, an "artificial intelligence generated datum" is a data element that is generated using an AI model. In some embodiments, AI generated datum 112 may include text-based responses, visual representations, audio signals, numerical values, or any other form of data conveyed to a user or another system as a result of computational processing. As a non-limiting example, AI generated datum 112 may include a response generated for a question or query. For example, and without limitation, AI generated datum 112 may include a recommendation of one or more suitable clinical trial programs for a user. In some embodiments, AI generated datum 112 may be related to a treatment protocol for a diagnosis. For example, and without limitation, AI generated datum 112 may include a treatment plan and/or a personalized medical solution.

With continued reference to FIGS. 1A-B, for the purposes of this disclosure, an "artificial intelligence model" is a computational model that processes input data using AI-based techniques to generate an output. As a non-limiting example, AI model 116 may include neural networks, decision trees, support vector machines, probabilistic models, or ensemble learning techniques. In some embodiments, AI model 116 may be trained using supervised learning, unsupervised learning, reinforcement learning, or a combination thereof. In some embodiments, training data for AI model 116 may include labeled datasets, unlabeled datasets, real-time streaming data, or synthetic data generated through data augmentation techniques. In some embodiments, AI model 116 may include an output generation machine-learning model that generates an output data structure (AI generated datum 112) found in U.S. Nonprovisional patent application Ser. No. 19/057,579, filed on Feb. 19, 2025, and entitled "APPARATUS AND METHODS FOR GENERATING DATA INTELLIGENCE," the entirety of which is incorporated herein as a reference. In some embodiments, AI model 116 may include a chatbot that generates an output (AI generated datum 112) as a function of a query found in U.S. Nonprovisional patent application Ser. No. 19/191,042, filed on Apr. 28, 2025, and entitled "APPARATUS AND METHOD FOR GENERATING RESOURCE OUTPUT AS A FUNCTION OF A QUERY AND MULTIMODAL DATA," the entirety of which is incorporated herein as a reference. For the purposes of this disclosure, "chatbot" is an artificial intelligence (AI) program designed to simulate human conversation or interaction through text, voice-based or image-based communication. The chatbot described herein is further described in detail with respect to FIG. 3. In some embodiments, AI model 116 may include a generative model that generates recommended course of action (AI generated datum 112) from U.S. Nonprovisional patent application Ser. No. 19/057,446, filed on Feb. 19, 2025, and entitled "APPARATUS AND METHODS FOR MATCHING USER DATA WITH THIRD-PARTY DATA STRUCTURES," the entirety of which is incorporated herein as a reference. In some embodiments, AI model 116 may include a process module that generates a contextual response (AI generated datum 112) from U.S. Nonprovisional patent application Ser. No. 18/762,268, filed on Jul. 2, 2024, and entitled "SYSTEM AND METHODS FOR DELIVERING CONTEXTUAL RESPONSES THROUGH DYNAMIC INTEGRATIONS OF DIGITAL INFORMATION REPOSITORIES WITH INQUIRIES," the entirety of which is incorporated herein as a reference.

With continued reference to FIGS. 1A-B, in some embodiments, AI model 116 may include a large language model (LLM) 120. A "large language model," as used herein, is a deep learning algorithm that can recognize, summarize, translate, predict and/or generate text and other content based on knowledge gained from massive datasets. LLM 120 may be a type of generative artificial intelligence (AI). LLMs 120 may be trained on large sets of data; for example, training sets may include greater than 1 million words. Training sets may be drawn from diverse sets of data such as, as non-limiting examples, novels, blog posts, articles, emails, and the like. Training sets may include a variety of subject matters, such as, as nonlimiting examples, medical tests, romantic ballads, beat poetry, emails, advertising documents, newspaper articles, and the like. LLMs 120, in some embodiments, may include GPT, GPT-2, GPT-3, and other language processing models. LLM may be used to augment the text in an article based on a prompt. Training data may correlate elements of a dictionary related to linguistics, as described above, to a prompt. LLM 120 may include a text prediction based algorithm configured to receive an article and apply a probability distribution to the words already typed in a sentence to work out the most likely word to come next in augmented articles. For example, if the words already typed are "Nice to meet," then it is highly likely that the word "you" will come next. LLM 120 may output such predictions by ranking words by likelihood or a prompt parameter. For the example given above, the LLM may score "you" as the most likely, "your" as the next most likely, "his" or "her" next, and the like.

With continued reference to FIGS. 1A-B, LLM 120 may include an attention mechanism, utilizing a transformer as described further below. An "attention mechanism," as used herein, is a part of a neural architecture that enables a system to dynamically highlight relevant features of the input data. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying an attention mechanism, LLM 120 may predict the next word by searching for a set of position in a source sentence where the most relevant information is concentrated. LLM 120 may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation. In some embodiments, LLM 120 may include encoder-decoder model incorporating an attention mechanism.

With continued reference to FIGS. 1A-B, LLM 120 may include a transformer architecture. In some embodiments, encoder component of LLM 120 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIGS. 1A-B, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 120 may predict the next word by searching for a set of position in a source sentence where the most relevant information is concentrated. LLM 120 may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation.

With continued reference to FIGS. 1A-B, an attention mechanism may include generalized attention self-attention, multi-head attention, additive attention, global attention, and the like. In generalized attention, when a sequence of words or an image is fed to LLM 120, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 120 may pick up particular parts at different positions in the input sequence and over time compute an initial composition of the output sequence. In multi-head attention, LLM 120 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 120 may be repeated over several iterations, each computation may form parallel layers known as attention heads. Each separate head May independently pass the input sequence and corresponding output sequence element through a separate head. A final attention score may be produced by combining attention scores at each head so that every nuance of the input sequence is taken into consideration. In additive attention (Bahdanau attention mechanism), LLM 120 may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM 120 may either attend to all source words or predict the target sentence, thereby attending to a smaller subset of words.

With continued reference to FIGS. 1A-B, multi-headed attention in encoder may apply a specific attention mechanism called self-attention. Self-attention allows the models to associate each word in the input, to other words. So, as a non-limiting example, LLM 120 may learn to associate the word "you," with "how" and "are". It's also possible that LLM 120 learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplies using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIGS. 1A-B, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIGS. 1A-B, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIGS. 1A-B, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIGS. 1A-B, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIGS. 1A-B, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the SoftMax of this matrix is taken, the negative infinities will be zeroed out; this leaves "zero" attention scores for "future tokens."

With continued reference to FIGS. 1A-B, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIGS. 1A-B, the output of the pointwise feedforward layer may be fed through a final linear layer. This final linear layer may act as a classifier. This classifier may be as big as the number of classes that you have. For example, if you have 10,000 classes for 10,000 words, the output of that classes will be of size 10,000. The output of this classifier may be fed into a SoftMax layer which may serve to produce probability scores between zero and one. The index may be taken of the highest probability score in order to determine a predicted word.

With continued reference to FIGS. 1A-B, decoder may take this output and add it to the decoder inputs. Decoder may continue decoding until a token is predicted. Decoder may stop decoding once it predicts an end token. In some embodiment, decoder may be stacked N layers high, with each layer taking in inputs from the encoder and layers before it. Stacking layers may allow LLM to learn to extract and focus on different combinations of attention from its attention heads.

With continued reference to FIGS. 1A-B, memory 108 contains instructions configuring processor 104 to retrieve validated data 124 as a function of AI generated datum 112. For the purposes of this disclosure, "validated data" is data that has been validated to meet validation condition. In a non-limiting example, validated data 124 may be validated to be true or to be resulting a positive result. In some embodiments, validated data 124 may include medical records, insights about specific disease, treatment protocol, research paper, and the like that are validated and resulted a positive outcome. As a non-limiting example, validated data 124 may include clinical trial results that have been peer-reviewed and approved by regulatory authorities.

With continued reference to FIGS. 1A-B, in some embodiments, processor 104 may retrieve validated data 124 or validate AI generated datum 112 as a function of subject data 128 associated with AI generated datum 112. For the purposes of this disclosure, "subject data" is any data related to a subject. For the purposes of this disclosure, a "subject" is an individual or entity that is subject to a medical care. As a non-limiting example, subject may include a patient. For example, and without limitation, subject data 128 may include a name, an address, a social security number, a date of birth and/or the like. In one or more embodiments, subject data 128 may include information such as, but not limited to, medical information pertaining to previous diagnoses, current medications being taken, recent medical visits, future medical visits, age, height, gender, weight and/or the like of a subject. In one or more embodiments, subject data 128 may include any medical information pertaining to a particular individual. In one or more embodiments, subject data 128 may include any information pertaining to a subject. In some embodiments, subject data 128 may include information about the medication a subject is currently taking, the dosage of the medication, medical professionals that the subject has interacted with or will interact with and/or the like. In one or more embodiments, subject data 128 may include current or previous medical diagnoses made by a medical professional, various allergies a subject may have, medications a subject has taken in the past, upcoming medical visits and/or the like. In one or more embodiments, subject data 128 may include information about a particular health insurance the subject has. This may include but is not limited to deductibles, premiums, cost of co-pays, the providers that a user may visit and/or the like.

With continued reference to FIGS. 1A-B, in some embodiments, subject data 128 and/or AI generated datum 112 may be classified to a subject cohort 132 using a cohort classifier. For the purposes of this disclosure, a "subject cohort" is a group of subjects that share one or more characteristics or conditions. Cohort classifier may be consistent with any classifier discussed in this disclosure. Cohort classifier may be trained on cohort training data, wherein the cohort training data may include exemplary subject data and/or AI generated data correlated to exemplary subject cohorts. In some embodiments, cohort classifier may include a clustering algorithm configured to automatically group subjects based on similarity across multiple data dimensions. In some embodiments, clustering algorithm may analyze structured or unstructured data (e.g., subject data 128 and/or AI generated datum 112 to identify subject cohorts 132. As non-limiting examples, clustering algorithm may include k-means clustering, hierarchical clustering, density-based spatial clustering of applications with noise (DBSCAN), Gaussian mixture models (GMM), or self-organizing maps (SOMs). In some implementations, clustering algorithm may include AI-driven or unsupervised learning techniques such as autoencoders, t-SNE, or UMAP for dimensionality reduction prior to clustering. In some embodiments, subject data 128 and/or AI generated datum 112 may be classified to a subject cohort 132, processor 104 may retrieve validated data 124 or validated AI generated datum 112 based on the subject cohort 132 and the resulting output may be used to update validated training data 136.

With continued reference to FIGS. 1A-B, processor 104 is configured to retrieve validated data 124 from a validated database 140. In some embodiments, apparatus 100 may include a validated database 140. As used in this disclosure, a "validated database" is a data structure configured to store data that is validated to be true or resulting a positive outcome. As a non-limiting example, validated database 140 may store validated data 124, and the like. In one or more embodiments, validated database 140 may include inputted or calculated information and datum related to validated data 124. In some embodiments, a datum history may be stored in validated database 140. As a non-limiting example, the datum history may include real-time and/or previous inputted data related to validated data 124. As a non-limiting example, validated database 140 may include instructions from a user, who may be an expert user, a past user in embodiments disclosed herein, or the like, where the instructions may include examples of the data related to validated data 124.

With continued reference to FIGS. 1A-B, in some embodiments, processor 104 may be communicatively connected with validated database 140. For example, and without limitation, in some cases, validated database 140 may be local to processor 104. In another example, and without limitation, validated database 140 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store validated database 140. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIGS. 1A-B, in some embodiments, validated database 140 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1A, in some embodiments, validated database 140 may include a positive validation layer 144 and a negative validation layer 148. In some embodiments, positive validation layer 144 may store AI generated datum 112 and/or validated data 124 that have been confirmed to meet validation conditions 152. In some embodiments, negative validation layer 148 may store AI generated datum 112 and validated data 124 that have been determined to be inaccurate, unreliable, or inconsistent with validation conditions 152. In some embodiments, processor 104 may be configured to dynamically update, classify, and retrieve data from positive validation layer 144 and negative validation layer 148. For the purposes of this disclosure, a "positive validation layer" is a structured portion of a validated database configured to store AI generated datum and validated data that have been verified as true or to be associated with a positive outcome. In some embodiments, positive validation layer 144 may include AI generated datum 112 that aligns with historical validated data 124 correlation of validated data 124 that was matched with AI generated datum 112, and the like. In some embodiments, processor 104 may assign metadata, confidence scores 156, or validation timestamps to data stored in positive validation layer 144. For the purposes of this disclosure, a "negative validation layer" is a structured portion of a validated database configured to store AI generated datum and validated data that have been determined to be associated with a negative outcome or to be incorrect, inconsistent, or invalid. In some embodiments, negative validation layer 148 may include AI generated datum 112 with low confidence scores, correlation of validated data 124 that was not matched with AI generated datum 112, data that has been validated to be associated with negative outcome, and the like. In some implementations, data stored in negative validation layer 148 may be flagged for further review, retraining of AI models 116, or manual expert verification.

With continued reference to FIG. 1A, in some embodiments, retrieving validated data 124 may include selecting a validation layer from among positive validation layer 144 and negative validation layer 148 as a function of context of AI generated datum 112, and retrieving data from the selected validation layer. In some embodiments, selection of a validation layer may be determined by processor 104 based on predefined selection criteria, contextual requirements, or specific validation rules applied to AI generated datum 112. In some embodiments, processor 104 may determine which validation layer to retrieve data from based on a validation requirement, context, features or characteristics of AI generated datum 112, validation context, or confidence level requirements. As a non-limiting example, processor 104 may retrieve data from positive validation layer 144 when AI generated datum 112 requires validation against previously confirmed and reliable information. In a non-limiting example, if AI generated datum 112 is an AI-generated medical diagnosis, processor 104 may retrieve data from positive validation layer 144 to compare it against validated clinical guidelines and treatment protocols. In some embodiments, processor 104 may retrieve data from negative validation layer 148 when determining whether AI generated datum 112 exhibits characteristics similar to previously invalidated data. In a non-limiting example, if AI generated datum 112 is a research hypothesis generated by an AI model, processor 104 may retrieve data from negative validation layer 148 to determine if similar hypotheses were previously invalidated due to methodological errors or inconsistencies.

With continued reference to FIG. 1A, for the purposes of this disclosure, a "validation requirement" is a context-specific condition, constraint, or objective for validation of AI generated datum. In some embodiments, validation requirement may be based on a type of AI generated datum 112, criticality of its application, intended outcome, or the domain-specific sensitivity of AI generated datum 112 (e.g., clinical, legal, financial, or regulatory). As a non-limiting example, validation requirement may include a specification that AI generated datum 112 must align with authoritative sources, meet regulatory standards, avoid known errors, or be distinguishable from previously invalidated content. In some embodiments, processor 104 may be configured to analyze validation requirement associated with AI generated datum 112 and select a validation layer from which to retrieve data for validation. In some embodiments, processor 104 may determine validation requirement associated with AI generated datum 112 using a large language model, language processing module, feature extraction model, and/or the like. As a non-limiting example, if validation requirement specifies that AI generated datum 112 must be confirmed as consistent with known reliable or accurate outputs, processor 104 may select positive validation layer 144 and retrieve validated data entries from the positive validation layer 144. As another non-limiting example, if validation requirement specifies that AI generated datum 112 must avoid or be distinguished from known failure modes, unsafe recommendations, or previously invalidated outputs, processor 104 may select negative validation layer 148 and retrieve entries from the negative validation layer 148. In some embodiments, validation requirement may be encoded as metadata associated with AI generated datum 112 or determined dynamically based on usage context. For instance, and without limitation, processor 104 may infer that clinical outputs require conservative validation approaches and prioritize positive validation layer 144, while exploratory outputs in early-phase research applications may permit validation against both layers. In some embodiments, user may manually determine validation requirement for AI generated datum 112.

With continued reference to FIG. 1A, in some embodiments, retrieving data from the selected validation layer may include executing a query against data (e.g., validated data 124) stored within the selected validation layer. As a non-limiting example, processor 104 may retrieve data using search parameters based on attributes of AI generated datum 112, such as statistical properties, textual similarity, semantic matching, or historical validation status. In some implementations, processor 104 may retrieve validated data 124 based on metadata attributes such as validation timestamp, source credibility, or expert verification history.

With continued reference to FIG. 1A, in some embodiments, processor 104 may dynamically determine whether AI generated datum 112 or validated data 124 should be classified into positive validation layer 144 or negative validation layer 148 based on validation conditions 152, updated or new articles or news related to validated data 124, and the like. As a non-limiting example, if AI generated datum 112 is a treatment protocol generated for a patient's health condition, processor 104 may assess whether the treatment protocol aligns with historical clinical data, regulatory guidelines, and prior successful patient outcomes (validated data 124). If the treatment protocol meets validation conditions 152, processor 104 may store it in positive validation layer 144. Conversely, if the protocol contradicts established medical standards or lacks supporting evidence, processor 104 may classify it in negative validation layer 148. In some embodiments, processor 104 may be configured to facilitate movement of AI generated datum 112 or validated data 124 between positive validation layer 144 and negative validation layer 148 based on dynamic validation reassessment. For example, and without limitation, processor 104 may execute machine learning models or statistical evaluation techniques to determine whether data in negative validation layer 148 should be re-evaluated based on new evidence (validated data 124). If AI generated datum 112 stored in negative validation layer 148 later meets updated validation conditions 152, processor 104 may transfer it to positive validation layer 144. Conversely, if newly available validated data 124 invalidates an entry previously classified in positive validation layer 144, processor 104 may reclassify the entry into negative validation layer 148. In some embodiments, processor 104 may incorporate user feedback, expert review, or real-world application data.

With continued reference to FIG. 1A, in some embodiments, processor 104 may provide differential access control for positive validation layer 144 and negative validation layer 148. For example, and without limitation, processor 104 may allow AI model 116 to access data stored in positive validation layer 144 while restricting access to data in negative validation layer 148 to users or AI model 116 retraining processes. In some implementations, processor 104 may generate validation reports indicating classification history, validation timestamps, and confidence scores 156 of AI generated datum 112.

With continued reference to FIG. 1A, in some embodiments, processor 104 may be configured to compare validated data 124 stored in positive validation layer 144 and negative validation layer 148 to determine which layer of validated data 124 should be used for validating AI generated datum 112. By analyzing the characteristics, reliability, and contextual relevance of data stored in each layer, processor 104 may select a validation layer for validation to ensure that AI generated datum 112 is assessed against the most accurate and relevant validation sources. In a non-limiting example, processor 104 may prioritize the use of positive validation layer 144 when validating AI generated datum 112. For example, and without limitation, if AI generated datum 112 is a machine-generated diagnosis recommendation, processor 104 may validate it by comparing it against previously validated medical records, treatment protocols, and clinical studies stored in positive validation layer 144. In some embodiments, processor 104 may utilize data from negative validation layer 148 to refine the validation process. For example, and without limitation, if AI generated datum 112 exhibits characteristics similar to data stored in negative validation layer 148, processor 104 may classify it as potentially invalid or apply stricter validation conditions 152 before determining its reliability. As a non-limiting example, if AI generated datum 112 is a financial transaction flagged for fraud detection, processor 104 may compare it against historically flagged fraudulent transactions stored in negative validation layer 148 to assess the likelihood that the new datum is invalid. In some embodiments, processor 104 may compare positive validation layer 144 and negative validation layer 148 to detect inconsistencies, conflicting data points, or evolving validation patterns. In a non-limiting example, processor 104 may identify data entries in positive validation layer 144 that are semantically or structurally similar to entries in negative validation layer 148. In some embodiments, processor 104 may use direct attribute comparison, metadata analysis, or semantic similarity assessment using embedding-based vector representations. For example, and without limitation, processor 104 may apply a natural language embedding model (e.g., a transformer-based encoder) to convert both layers' contents into a high-dimensional vector space, allowing it to compute cosine similarity or other distance metrics to identify potential overlaps or contradictions. Upon identifying a pair of entries from positive validation layer 144 and negative validation layer 148 that exhibit high similarity in content but differ in validation outcome, processor 104 may flag the entries as a validation conflict pair. In some embodiments, such conflicts may be indicative of outdated, misclassified, or contextually ambiguous data. In some embodiments, if discrepancies between data stored in these layers are detected, processor 104 may perform additional validation steps. In another embodiments, processor 104 may perform query external authoritative sources, or request expert review for resolution. In a non-limiting example, processor

104 may perform cross-referencing external data sources, applying statistical confidence measurements, or triggering a human review process.

With continued reference to FIG. 1B, in some embodiments, apparatus 100 may include two separate databases: a validated database 140 and an invalidated database 142. In some embodiments, validated database 140 may be configured to store validated data 124 that is validated to be true or result a positive outcome, while the invalidated database 142 may be configured to data that have been determined to be inaccurate, inconsistent, or unreliable. Processor 104 may dynamically interact with both databases to perform validation, refine validation conditions 152, and/or determine whether AI generated datum 112 should be output or stored in validated database 140 or invalidated database 142. For the purposes of this disclosure, an "invalidated database" is a structured data repository that stores data that have been determined to be incorrect, unreliable, or inconsistent. In some embodiments, invalidated database 142 may contain data that are similar to validated data 124 but determined to be invalid. In some embodiments, processor 104 may dynamically determine which database, validated database 140 or invalidated database 142, should be used when validating AI generated datum 112. As a non-limiting example, if AI generated datum 112 is a newly generated recommendation for a cancer treatment protocol, processor 104 may retrieve similar prior recommendations from validated database 140 to assess whether the new datum aligns with historically validated treatment protocols. If no sufficiently similar validated data is available, processor 104 may compare AI generated datum 112 with entries in invalidated database 142 to determine whether it exhibits characteristics previously associated with ineffective or erroneous treatments. As another non-limiting example, if AI generated datum 112 is a newly generated recommendation for a cancer treatment protocol, processor 104 may compare AI generated datum 112 with entries in invalidated database 142 to determine whether it exhibits characteristics previously associated with ineffective or erroneous treatments. If there is no signs that exhibit that AI generated datum 112 is similar to entries in invalidated database 142, processor 104 may compare AI generated datum 112 with entries in validated database 140.

With continued reference to FIG. 1B, in some implementations, processor 104 may compare data stored in validated database 140 and invalidated database 142 to detect conflicts, inconsistencies, or emerging patterns. In a non-limiting example, if processor 104 determines that entries in validated database 140 contradict those in invalidated database 142, it may trigger additional validation procedures. For example, and without limitation, while entries in validated database 140 may contain data that is validated to be true or associated with a positive outcome and entries in invalidated database 142 may contain data that is confirmed to be incorrect or associated with a negative outcome, if processor 104 compares AI generated datum 112 against both databases and detects that the AI generated datum 112 conforms with entries in both databases (e.g., AI generated datum 112 being equivalent with data classified as correct and also equivalent to data classified as incorrect), processor 104 may initiate either a revalidation process, regeneration of AI generated datum 112, or the like. As a non-limiting example, processor 104 may perform cross-referencing external data sources, applying statistical significance tests, or prompting human expert review. In some embodiments, processor 104 may facilitate the movement of data between validated database 140 and invalidated database 142. In a non-limiting example, if AI generated datum 112 initially stored in invalidated database 142 is later determined to meet updated validation conditions 152, processor 104 may transfer it to validated database 140. Similarly, if newly discovered evidence invalidates a datum stored in validated database 140, processor 104 may reassign it to invalidated database 142 to prevent its further use in AI-driven decision-making processes. In some implementations, processor 104 may generate validation reports summarizing the relationship between validated database 140 and invalidated database 142. These reports may indicate how AI generated datum 112 has been classified over time, highlight validation trends, and provide insights into how validation conditions 152 are evolving based on real-world outcomes.

With continued reference to FIG. 1B, in some embodiments, retrieving validated data 124 may include selecting one database from among validated database 140 and invalidated database 142, and retrieving data from the selected database. In some embodiments, the selection of a database may be determined dynamically by processor 104 based on validation conditions 152, contextual parameters, or specific validation rules applied to AI generated datum 112. In some embodiments, processor 104 may determine which database to retrieve data from based on the validation requirements of AI generated datum 112. As a non-limiting example, if AI generated datum 112 requires validation against verified and trusted data sources, processor 104 may select validated database 140 for retrieval. In another example, if AI generated datum 112 is a newly generated treatment protocol for a medical condition, processor 104 may retrieve previously validated treatment protocols from validated database 140 to assess whether AI generated datum 112 aligns with clinically approved protocols. In some embodiments, processor 104 may retrieve data from invalidated database 142 to assess whether AI generated datum 112 exhibits characteristics similar to previously invalidated data. In another example, if AI generated datum 112 is an AI-generated research hypothesis, processor 104 may retrieve previously invalidated hypotheses from invalidated database 142 to assess whether AI generated datum 112 aligns with findings that were previously disproven or rejected due to methodological errors.

With continued reference to FIG. 1B, in some embodiments, processor 104 may be configured to ingest new data from one or more reputable external sources for validated database 140 and/or invalidated database 142. As a non-limiting example, external sources may include peer-reviewed literature databases, governmental or regulatory repositories, curated medical or scientific knowledge bases, academic datasets, industry-specific archives, or approved third-party data vendors. In some embodiments, ingestion of new data may occur through scheduled synchronization, real-time data feeds, secure APIs, or automated data harvesting mechanisms. In some embodiments, processor 104 may include or be operatively coupled to a web crawler configured to discover and retrieve information from publicly accessible or licensed sources as described further in detail below. In some embodiments, once new data is acquired, processor 104 may evaluate the new data for consistency, accuracy, and relevance (e.g., whether the new data is validated or not or associated with positive outcome or negative outcome). In some embodiments, processor 104 may generate one or more embeddings of the new data using an encoder to represent semantic or structural content of the new data as a high-dimensional vector. In some embodiments, processor 104 may then compare the embedding of the newly ingested data to embeddings of existing data stored in validated database 140 and/or invalidated database 142 by computing similarity scores between the new data and existing entries. In a non-limiting example, if the new data conflicting with data entries in validated database 140 and/or invalidated database 142, processor 104 may re-evaluate the older data entries, remove the older data entries from validated database 140, reclassify the older data entries from validated database 140 into invalidated database 142, prompt a user for evaluation, or the like. In some embodiments, if the new data aligns with entries in validated database 140 and/or invalidated database 142, processor 104 may classify the new data into validated database 140 and/or invalidated database 142.

With continued reference to FIG. 1B, in some embodiments, processor 104 may be configured to find information to add to validated database 140 and/or invalidated database 142 using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. The web crawler may be seeded and/or trained with a reputable website to begin the search. Web crawler may be generated by processor 104. In some embodiments, web crawler may be trained with information received from user through a user interface. In some embodiments, web crawler may be configured to generate a web query. A web query may include search criteria received from user. For example, user may submit a plurality of websites for web crawler to search to information to add to validated database 140 and/or invalidated database 142. Additionally, web crawler function may be configured to search for and/or detect one or more data patterns. A "data pattern" as used in this disclosure is any repeating forms of information. In some embodiments, web crawler may be configured to determine the relevancy of a data pattern. Relevancy may be determined by a relevancy score. A relevancy score may be automatically generated by processor 104, received from a machine learning model, and/or received from user. In some embodiments, a relevancy score may include a range of numerical values that may correspond to a relevancy strength of data received from a web crawler function. As a non-limiting example, a web crawler function may search the Internet for information to add to validated database 140 and/or invalidated database 142.

With continued reference to FIG. 1B, in some embodiments, retrieving data from the selected database may include executing a query against validated data 124 or invalidated data 124 stored within the selected database. In some embodiments, processor 104 may retrieve data using search parameters based on attributes of AI generated datum 112, such as statistical correlations, semantic relationships, or prior validation outcomes. In some implementations, processor 104 may retrieve data based on metadata attributes such as validation timestamps, source credibility, or expert review status.

With continued reference to FIGS. 1A-B, in some embodiments, processor 104 may receive validated data from a user device 160. For the purposes of this disclosure, a "user device" is any device a user use to input data. As a non-limiting example, user device 160 may include a laptop, desktop, tablet, mobile phone, smart phone, smart watch, kiosk, screen, smart headset, or things of the like. In some embodiments, user device 160 may include an interface configured to receive inputs from a user. For the purposes of this disclosure, a "user" is any person or individual that is using or has used an apparatus. In some embodiments, a user may manually input any data into apparatus 100 using user device 160. In some embodiments, a user may have a capability to process, store or transmit any information independently.

With continued reference to FIGS. 1A-B, in some embodiments, processor 104 may receive validated data 124 using an application programming interface (API). As used in the current disclosure, an "application programming interface" is a software interface for two or more computer programs to communicate with each other. As a non-limiting example, API may include EHR APIs, PubMed API, Fast Healthcare Interoperability Resources (FHIR) API, and the like. An application programming interface may be a type of software interface, offering a service to other pieces of software. In contrast to a user interface, which connects a computer to a person, an application programming interface may connect computers or pieces of software to each other. An API may not be intended to be used directly by a person (e.g., an end user) other than a computer programmer who is incorporating it into the software. An API may be made up of different parts which act as tools or services that are available to the programmer. A program or a programmer that uses one of these parts is said to call that portion of the API. The calls that make up the API are also known as subroutines, methods, requests, or endpoints. An API specification may define these calls, meaning that it explains how to use or implement them. One purpose of API may be to hide the internal details of how a system works, exposing only those parts a programmer will find useful and keeping them consistent even if the internal details later change. An API may be custom-built for a particular pair of systems, or it may be a shared standard allowing interoperability among many systems. The term API may be often used to refer to web APIs, which allow communication between computers that are joined by the internet. API may be configured to query for web applications in order to retrieve validated data 124 to another web application, database (e.g., validated database 140), and the like. An API may be further configured to filter through web applications according to a filter criterion. In this disclosure, "filter criteria" are conditions the web applications must fulfill in order to qualify for API. Web applications may be filtered based on these filter criteria. Filter criteria may include, without limitation, types of treatment or disease, medical conditions, and the like.

With continued reference to FIGS. 1A-B, memory 108 contains instructions configuring processor 104 to validate AI generated datum 112 as a function of validated data 124 using a validation AI agent 164. For the purposes of this disclosure, "validation" is a process of assessing whether an AI generated datum meets predefined criteria for accuracy, reliability, or consistency with validated data. In some embodiments, validation may include comparing the AI generated datum 112 against validated data 124, applying statistical analysis to measure deviation from expected results. In some embodiments, validation may include utilizing domain-specific heuristics to determine correctness. For the purposes of this disclosure, a "validation artificial intelligence agent" is an AI-powered computing program or device that is configured to assess accuracy, reliability, or authenticity of an AI generated datum by comparing it against validated data. In some embodiments, validation AI agent 164 may utilize machine-learning models, rule-based algorithms, statistical methods, or a combination thereof to determine whether AI generated datum 112 meets validation conditions 152.

With continued reference to FIGS. 1A-B, validation AI agent 164 is trained with validated training data 136, wherein the validated training data 136 includes historical AI generated data correlated to historical validated data. For the purposes of this disclosure, "validated training data" is data containing correlations that a machine-learning process may use to model relationships between AI generated datum and validated data. In some embodiments, processor 104 may be configured to generate validated training data 136. In a non-limiting example, validated training data 136 may include correlations between exemplary AI generated data, exemplary validated data, exemplary validation conditions, exemplary user data, and the like. In some embodiments, validated training data 136 may be stored in validated database 140. In some embodiments, validated training data 136 may be received from one or more users, validated database 140, external computing devices, and/or previous iterations of processing. As a non-limiting example, validated training data 136 may include instructions from a user, who may be an expert user, a past user in embodiments disclosed herein, or the like, which may be stored in memory and/or stored in validated database 140, where the instructions may include labeling of training examples. In some embodiments, validated training data 136 may be updated iteratively on a feedback loop. As a non-limiting example, processor 104 may update validated training data 136 iteratively through a feedback loop as a function of AI generated datum 112, validated data 124, validation conditions 152, subject data 128, or the like. In some embodiments, processor 104 may be configured to generate a validation AI agent 164. In a non-limiting example, generating validation AI agent 164 may include training, retraining, or fine-tuning validation AI agent 164 using validated training data 136 or updated validated training data 136. In some embodiments, processor 104 may be configured to validate AI generated datum 112 using validation AI agent 164 (i.e. trained or updated validation AI agent 164). In some embodiments, generating training data and training machine-learning models may be simultaneous.

With continued reference to FIGS. 1A-B, validation AI agent 164 is configured to generate an embedding of AI generated datum 112, match the AI generated datum 112 to at least a datum of validated data 124, wherein matching includes comparing the embedding of the AI generated datum 112 to one or more embeddings of validated data 124 to identify at least a similar datum, generate a confidence score 156 of the AI generated datum 112 based on the at least a similar datum and validate the AI generated datum 112 as a function of the confidence score 156.

With continued reference to FIGS. 1A-B, for the purposes of this disclosure, an "embedding" is a mathematical or numerical representation of data in a high-dimensional vector space. In some embodiments, embedding may transform AI generated datum 112 into one or more vectors. In some embodiments, an embedding may be generated using an encoder. In some embodiments, encoder may include a machine learning model, neural network, transformer-based architecture, or statistical projection technique. In some embodiments, encoder may process input data (e.g., AI generated datum 112, validated data 124, and the like) and produce an embedding that reflects relevant characteristics of the input.

With continued reference to FIGS. 1A-B, for the purposes of this disclosure, a "similar datum" is a data element that bears a measurable semantic, structural, statistical, or contextual resemblance to another data element. In some embodiments, a similar datum may be identified by comparing embeddings of validated data 124 and AI generated datum 112. In some embodiments, a degree of similarity between validated data 124 and AI generated datum 112 may be quantified using a metric such as cosine similarity, Euclidean distance, or another distance function in a multidimensional vector space. In some embodiments, processor 104 may compute cosine similarity between an embedding of AI-generated datum 112 and an embedding of validated data 124 to determine a degree of semantic or structural alignment between the two. In a non-limiting example, a higher similarity score may indicate that AI-generated datum 112 is consistent with validated data 124. In another non-limiting example, a low similarity score may indicate that AI-generated datum 112 may diverge significantly from validated data 124. In some embodiments, processor 104 may apply a threshold-based model, wherein a cosine similarity score above a predefined threshold results in classification of AI-generated datum 112 as valid, while scores below the threshold may result in invalidation or manual review. In some implementations, processor 104 may assign a confidence score 156 to AI-generated datum 112 based at least in part on its embedding similarity to validated data 124. The confidence score 156 may be used internally by validation AI agent 164 to determine whether additional validation steps are needed, or externally presented via user interface as a visual element to assist a user in interpreting the trustworthiness of the AI-generated datum 112.

With continued reference to FIGS. 1A-B, validation AI agent 164 is configured to match AI generated datum 112 to at least a datum of validated data 124, generate a confidence score 156 of the AI generated datum 112 based on the at least a matched datum of the validated data 124 and validate the AI generated datum 112 as a function of the confidence score 156. In some embodiments, processor 104 may match AI generated datum 112 to at least a datum of validated data 124 by extracting keywords or characteristics from each of the AI generated datum 112 and the validated data 124 and matching similar keywords. In some embodiments, processor 104 may extract keywords or characteristics from each of the AI generated datum 112 and the validated data 124 using a language processing module, image processing module or machine vision module as described in detail below. Once a match is found, validation AI agent 164 may generate a confidence score 156 for AI generated datum 112. Confidence score 156 may represent a level of certainty that AI generated datum 112 is accurate based on its similarity to validated data 124. In some embodiments, confidence score 156 may be calculated using various methods, such as probabilistic models, machine learning algorithms, or rule-based assessments. Then, validation AI agent 164 may determine whether AI generated datum 112 should be considered valid, based on confidence score 156. In a non-limiting example, if confidence score 156 meets or exceeds a predefined validation threshold 168, AI generated datum 112 may be validated and may be used for further processing. In another non-limiting example, if confidence score 156 falls below the validation threshold 168, AI generated datum 112 may be flagged for review, subjected to additional verification steps, or rejected.

With continued reference to FIGS. 1A-B, for the purposes of this disclosure, a "confidence score" is a quantitative measure representing the likelihood that an AI generated datum accurately corresponds to at least a datum of validated data. In some embodiments, confidence score 156 may be determined based on a comparison between AI generated datum 112 and validated data 124, taking into account factors such as validation conditions 152, similarity metrics, historical accuracy, statistical models, or machine-learning algorithms. As a non-limiting example, confidence score 156 may be expressed as a numerical value within a predefined range, such as a percentage or a probability value, and may be dynamically adjusted based on additional validation conditions 152 or contextual parameters. In some embodiments, validation AI agent 164 may implement a fuzzy set system to generate confidence score 156. The fuzzy set system is described further in detail with respect to FIG. 7.

With continued reference to FIGS. 1A-B, for the purposes of this disclosure, a "validation threshold" is a predefined value or range that serves as a decision criterion for determining whether a specific condition is met for validation. As a non-limiting example, validation threshold may include a minimum confidence score required for an AI generated datum 112 to be considered valid. In some embodiments, confidence score 156 may include a fixed numerical value, a probability range, or a weighted function. In a non-limiting example, if confidence score 156 meets or exceeds validation threshold 168, AI generated datum 112 may be validated; otherwise, it may be flagged for review, subjected to additional verification processes, or rejected. In some embodiments, user may manually input validation threshold 168. In some embodiments, processor 104 may retrieve validation threshold 168 from validated database 140. In some embodiments, processor 104 may dynamically adjust validation threshold 168 based on AI generated datum 112. As a non-limiting example, processor 104 may increase or decrease validation threshold 168 depending on AI generated datum 112. For instance, and without limitation, if AI generated datum 112 corresponds to a common and well-documented medical condition, such as hypertension, processor 104 may set a lower validation threshold 168, allowing minor deviations from validated data 124 while still considering the AI generated datum 112 valid. Conversely, if AI generated datum 112 corresponds to a rare disease or an experimental treatment, such as a protocol for managing a newly identified autoimmune disorder, processor 104 may increase validation threshold 168, requiring a higher confidence score 156 before validating the AI generated datum 112. In some embodiments, processor 104 may also consider real-time feedback, contextual factors, subject data 128, or the level of agreement among multiple sources to dynamically adjust validation threshold 168.

With continued reference to FIGS. 1A-B, in some embodiments, processor 104 may generate confidence score 156 as a function of validation conditions 152. In a non-limiting example, processor 104 may generate confidence score 156 as a function of whether AI generated datum 112 and validated data 124 that matches with the AI generated datum 112 meet validation conditions 152. For instance, and without limitation, suppose AI generated datum 112 is a treatment protocol generated in response to a query. Processor 104 may compare the AI generated datum 112 to validated data 124, which consists of established clinical guidelines. In this example, validation conditions 152 may include alignment with standard treatment guidelines, dosage accuracy, clinical trial evidence, and medical safety parameters. If the AI generated datum 112 closely matches validated data 124, processor 104 may assign a high confidence score 156, indicating that the AI generated datum 112 is consistent with validated data 124. On the other hand, if the AI generated datum 112 includes an unapproved medication or an incorrect dosage not supported by validated data 124, processor 104 may assign a lower confidence score 156. In this case, the AI generated datum 112 may be flagged for human review, additional verification, or rejection.

With continued reference to FIGS. 1A-B, for the purposes of this disclosure, "validation condition" is a set of predefined conditions, rules, thresholds, or parameters used to assess accuracy, reliability, consistency, or trustworthiness of an AI generated datum. In some embodiments, validation conditions 152 may include similarity measures between AI generated datum 112 and validated data 124, error margins within acceptable limits, compliance with domain-specific guidelines, conformance to machine-learning model confidence scores, or the like. As a non-limiting example, validation conditions 152 may include clinical accuracy based on historical patient records, statistical significance of research findings, reproducibility of AI-generated insights, adherence to industry regulations such as Food and Drug Administration (FDA), Health Insurance Portability and Accountability Act (HIPAA), or International Organization for Standardization (ISO) standards, adherence to medical facility regulations, or the like. In some embodiments, validation conditions 152 may be predefined. In some embodiments, user may manually input validation conditions 152. In some embodiments, validation conditions 152 may be stored in validated database 140 and processor 104 May retrieve validation conditions 152 from validated database 140.

With continued reference to FIGS. 1A-B, in some embodiments, processor 104 may dynamically determine validation conditions 152 as a function of AI generated datum 112. As a non-limiting example, processor 104 may analyze characteristics (keyword) of AI generated datum 112 and generate validation conditions 152 based on the characteristics. In some embodiments, processor 104 may analyze characteristics of AI generated datum 112 using a language processing module, machine vision module, image processing module, and the like. As a non-limiting example, processor 104 may extract keywords from texts, images, videos, document, and the like of AI generated datum 112 using language processing module, machine vision module, image processing module, and the like as described below. For example, and without limitation, if AI generated datum 112 is generated for a query from a user to generate a treatment protocol for a patient's health condition, validation conditions 152 may be associated with patient demographic, health condition, protocol outcome, protocol effectiveness, duration of the effect, and the like. For another example, and without limitation, if AI generated datum 112 is generated as a predictive analysis of disease progression based on a patient's medical history, validation conditions 152 may be associated with historical patient data, known disease progression models, accuracy of prior predictions, confidence scores from AI model 116, and alignment with established clinical guidelines (validated data 124). For another example, and without limitation, if AI generated datum 112 includes an AI-generated research insight, validation conditions 152 may be based on cross-referencing with peer-reviewed publications, citation frequency, reproducibility of findings, and alignment with existing validated scientific literature (validated data 124). In some embodiments, processor 104 may generate validation conditions 152 by weighing factors such as statistical significance, sample size, and experimental methodology of referenced studies.

With continued reference to FIGS. 1A-B, in some embodiments, validation AI agent 164 may implement language processing module to extract keywords or characteristics from AI generated datum 112 to determine validation conditions 152. The language processing module may be configured to extract, from the one or more documents or responses (AI generated datum 112), one or more words. One or more words may include, without limitation, strings of one or more characters, including without limitation any sequence or sequences of letters, numbers, punctuation, diacritic marks, engineering symbols, medical abbreviation or symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams," where all sequences of n consecutive characters are considered. Any or all possible sequences of tokens or words may be stored as "chains," for example for use as a Markov chain or Hidden Markov Model.

With continued reference to FIGS. 1A-B, language processing module may operate to produce a language processing model. Language processing model may include a program automatically generated by processor 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIGS. 1A-B, language processing module may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIGS. 1A-B, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIGS. 1A-B, language processing module may use a corpus of documents to generate associations between language elements in a language processing module may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 104 may automatically obtain the document using such an identifier, for instance by submitting a request to a database or compendium of documents such as JSTOR as provided by Ithaka Harbors, Inc. of New York.

With continued reference to FIGS. 1A-B, in some embodiments, validation AI agent 164 may implement image processing module to extract keywords or characteristics from images (AI generated datum 112) to determine validation conditions 152. As used in this disclosure, an "image processing module" is one or more distinct image processing technique designed to perform specific processing tasks and or operations to a digital image. For example, and without limitation, image processing module may be configured to compile plurality of digital images to create an integrated image. In an embodiment, image processing module may include a plurality of software algorithms that can analyze, manipulate, or otherwise enhance an image, such as, without limitation, a plurality of image processing techniques as described below. Image processing module may include, without limitation, modules that perform modifications such as random rotation, color jitter, Gaussian blur, perspective transform, shear transform, shadow casting, reflected light, ink color swap, moire, noise texturization, Gaussian noise, salt and pepper noise, folding and creasing, crumpled paper effect, and the like. In a non-limiting example, image processing module may include any combination of image processing module. In some cases, image processing module may be implemented with one or more image processing libraries such as, without limitation, OpenCV, PIL/Pillow, ImageMagick, and the like. Image processing module may include, be included in, or be communicatively connected to processor 104, and/or memory 108.

With continued reference to FIGS. 1A-B, in some embodiments, processor 104 may determine validation conditions 152 as a function of a keyword extracted from AI-generated datum 112. In some embodiments, processor 104 may then normalize or classify a keyword into a keyword category. For the purposes of this disclosure, a "keyword category" is a classification or grouping of semantically related keywords of AI generated datum. For example, and without limitation, keywords such as "hypertension," "blood pressure," and "cardiovascular condition" may all be associated with a keyword category such as "cardiology" or "clinical diagnosis." In some embodiments, processor 104 may classify keyword into keyword category using a keyword classifier trained with keyword classification training data that correlates keywords to keyword categories. In some embodiments, user may manually classify keywords. In some embodiments, processor 104 may then map keyword category to a validation condition. In some embodiments, processor 104 may use a lookup table, configuration schema, or trained classifier to retrieve a validation condition associated with a keyword or keyword category. In some embodiments, processor 104 may select validation condition based on keyword category using a condition classifier trained with condition classification training data that correlates keyword categories to validation conditions. For example, and without limitation, if a keyword corresponds to "treatment protocol," processor 104 may determine that validation conditions 152 require a cosine similarity threshold of at least 0.90, retrieval from a positive validation layer 144, and comparison against peer-reviewed clinical outcomes. In some embodiments, dynamic determination of validation conditions 152 may allow processor 104 to dynamically tailor validation logic to the content of AI-generated datum 112, ensuring that context-appropriate validation conditions 152 are applied.

With continued reference to FIGS. 1A-B, memory 108 contains instructions configuring processor 104 to output AI generated datum 112 based on validation of the AI generated datum 112. In some embodiments, processor 104 may output AI generated datum 112 by transmitting the AI generated datum 112 to a user interface 172, validated database 140, or external system. In a non-limiting example, if confidence score 156 of AI generated datum 112 meets or exceeds validation threshold 168, processor 104 may automatically approve the AI generated datum 112 for use. For example, and without limitation, if confidence score 156 of AI generated datum 112 meets or exceeds validation threshold 168, processor 104 may generate a user interface 172 or graphical user interface including the AI generated datum 112, associated validated data 124, confidence score 156, validation conditions 152, and/or the like. For example, and without limitation, if confidence score 156 of AI generated datum 112 meets or exceeds validation threshold 168, processor 104 may update or modify validated database 140 by adding AI generated datum 112 as a new validated entry, replacing an existing validated data 124 with AI generated datum 112, or appending AI generated datum 112 as a supplementary record associated with the matched validated data 124. In another non-limiting example, if the confidence score 156 falls below validation threshold 168, processor 104 may flag the AI generated datum 112 for human review before final output. In another non-limiting example, if the confidence score 156 falls below validation threshold 168, processor 104 may trigger AI model 116 to update its training data to include the AI generated datum 112 being invalidated or modify correlations associated with the AI generated datum 112 and regenerate AI generated datum 112. In another non-limiting example, if the confidence score 156 falls below validation threshold 168, processor 104 may update validated database 140 by logging AI generated datum 112 as an unvalidated entry, flagging AI generated datum 112 for further review, or associating AI generated datum 112 with additional validation requirements before acceptance. In some embodiments, outputting AI generated datum 112 may include generating a user interface 172 including a graphical user interface that illustrates which validation conditions 152 the AI generated datum 112 meets. In a non-limiting example, user interface 172 may illustrate a list or checkbox of validation conditions 152 indicating the ones that AI generated datum 112 meets. In some embodiments, processor 104 may output AI generated datum 112 by storing the validated AI generated datum 112 in memory 108.

With continued reference to FIGS. 1A-B, for the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 104. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. In a non-limiting example, GUI may include a visual element that is configured to indicate which of validation conditions 152 AI generated datum 112 meets. For the purposes of this disclosure, a "visual element" is a component that conveys information or facilitates interaction through graphical or visual representation. As a non-limiting example, visual element may include graphical representations such as icons, charts, buttons, progress indicators, text fields, checkboxes, data tables, drop-down menus, or validation markers. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIGS. 1A-B, in some embodiments, outputting AI generated datum 112 may include generating an alert 176 when the AI generated datum 112 is invalidated. For the purposes of this disclosure, an "alert" is an indication to inform a user. In some embodiments, processor 104 may transmit alert 176 to user device 160. In some embodiments, alert 176 may include audio, text, image, vibration, and the like. In some embodiments, alert 176 may include a text message, notification sound, phone call, notification banner, or the like. In a non-limiting example, processor 104 may generate and transmit alert 176 to user device 160 to inform that AI generated datum 112 is validated or invalidated, or the like. In some embodiments, alert 176 may be stored in validated database 140. In some embodiments, alert 176 may be retrieved from validated database 140. In some embodiments, outputting AI generated datum 112 may include triggering chatbot system to output AI generated datum 112 as a response.

Figure 2:
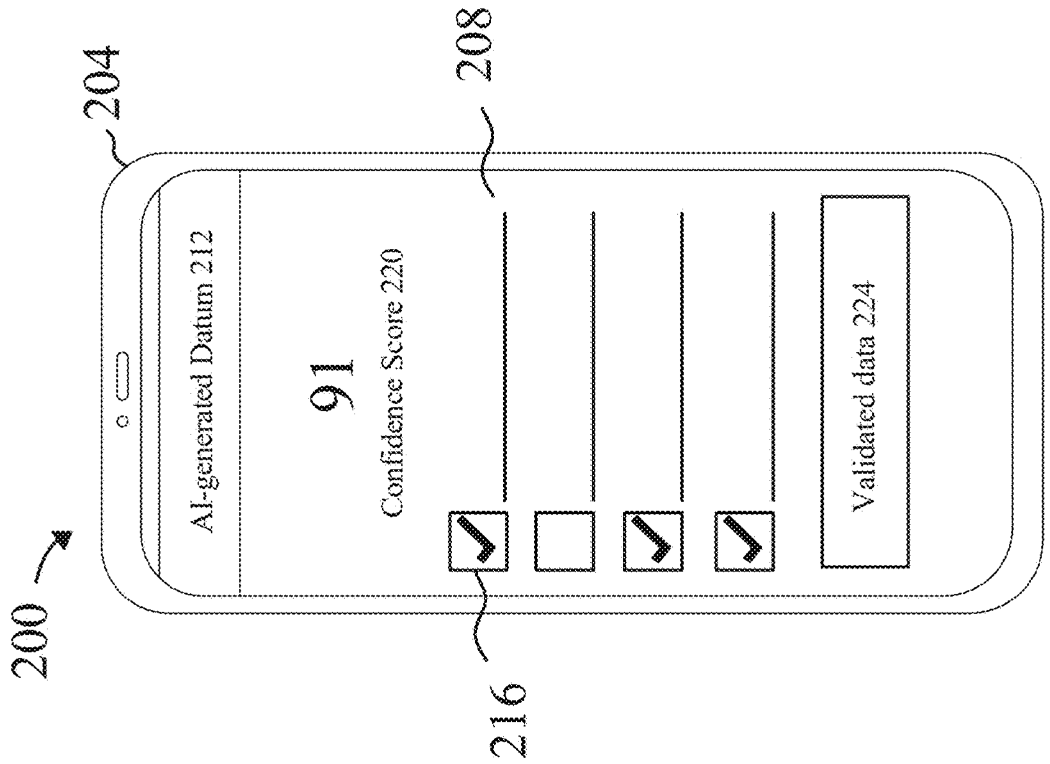
FIG. 2 illustrates an exemplary user interface.

Referring now to FIG. 2, an exemplary user interface 200 on a user device 204 is illustrated. In some embodiments, user interface 200 may include a graphical user interface that illustrates which validation conditions 208 the AI generated datum 212 meets. In a non-limiting example, user interface 200 may illustrate checkbox 216 of validation conditions 208 indicating the ones that AI generated datum 212 meets. In a non-limiting example, graphical representation may include indicators such as checkmarks, color-coded validation statuses, confidence scores 220, or progress bars, and the like. In some embodiments, user interface 200 may include sources (validated data 224) that supports validity of AI generated datum 212. In some embodiments, user interface 200 may include a confidence score 220 of AI generated datum 212 based on matched validated data 224. In some embodiments, user interface 200 may include an alert indicating invalidity of AI generated datum 212. User interface 200 illustrated in FIG. 2 is merely an example, and variations in layout, design, and functionality are within the scope of this disclosure. In some embodiments, user interface 200 may provide interactive elements that allow users to explore validation details, such as expanding specific validation conditions 208 to view supporting validated data 224 retrieved from validated database. In some implementations, user interface 200 may display data comparisons between AI generated datum 212 and both validated data 224 and invalidated data from invalidated database or negative validation layer to highlight similarities or discrepancies. In some embodiments, user interface 200 may be dynamically updated based on real-time validation processes performed by processor. As a non-limiting example, if AI generated datum 212 is initially validated against positive validation layer but is later re-evaluated due to new data, user interface 200 may update its graphical indicators to reflect the revised validation status. In some embodiments, user interface 200 may allow for user feedback or expert review inputs.

Figure 3:
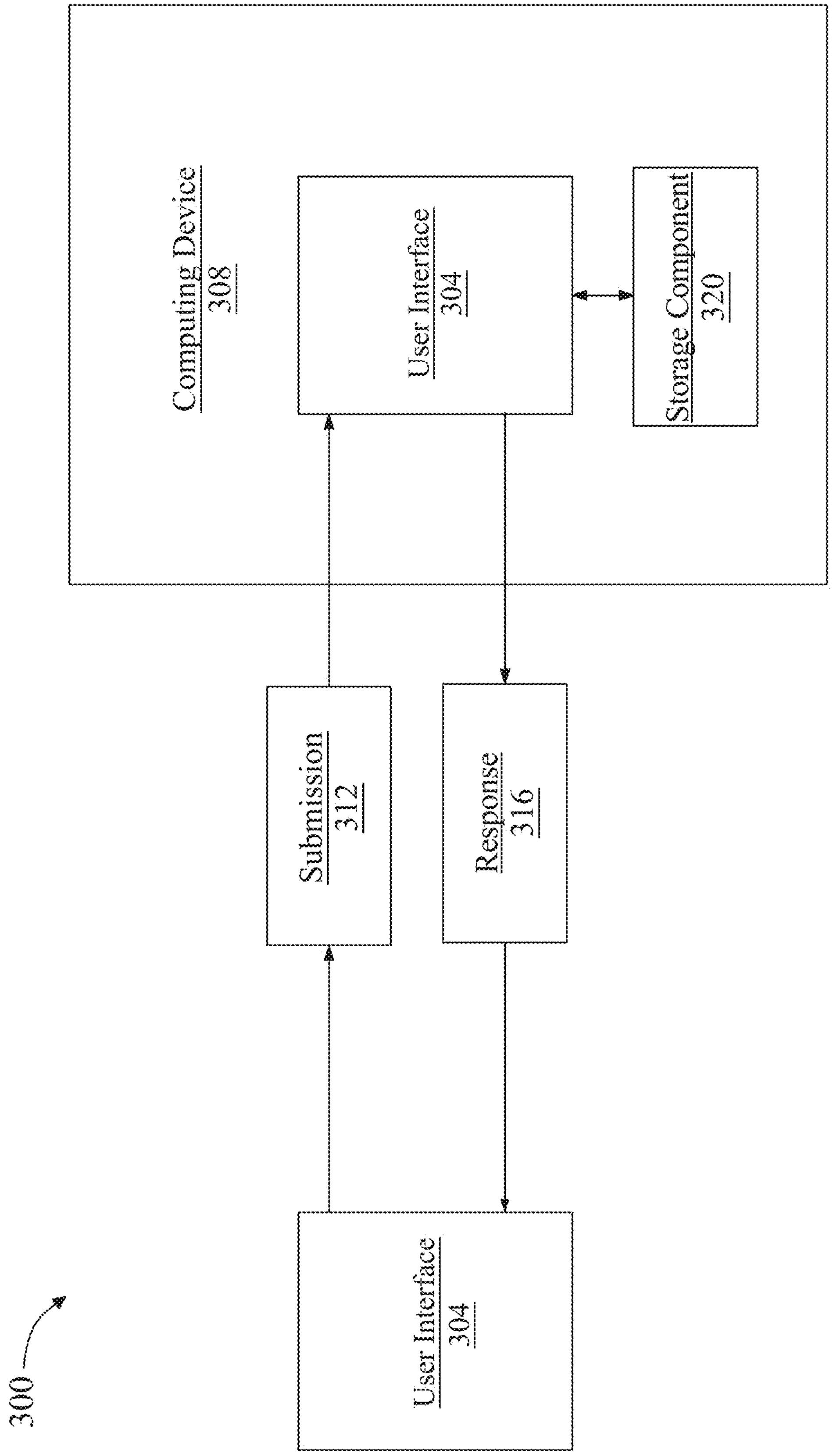
FIG. 3 illustrates an exemplary chatbot system.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may be remote to computing device 308 and communicative with the computing device 308, by way of one or more networks, such as without limitation the internet. Alternatively or additionally, user interface 304 may communicate with user device using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor. In some embodiments, processor processes a submission 312 using one or more of keyword recognition, pattern matching, and natural language processing. In some embodiments, processor employs real-time learning with evolutionary algorithms. In some cases, processor may retrieve a pre-prepared response from at least a storage component 320, based upon submission 312. Alternatively or additionally, in some embodiments, processor communicates a response 316 without first receiving a submission 312, thereby initiating conversation. In some cases, processor communicates an inquiry to user interface 304; and the processor is configured to process an answer to the inquiry in a following submission 312 from the user interface 304. In some cases, an answer to an inquiry present within a submission 312 from a user device may be used by computing device 308 as an input to another function.

With continued reference to FIG. 3, a chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "chatbot input" is any response that a user inputs into a chatbot as a response to a prompt or question.

With continuing reference to FIG. 3, computing device 308 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 308 may generate two or more decision trees, which may overlap; for instance, a root node of one tree may connect to and/or receive output from one or more terminal nodes of another tree, intermediate nodes of one tree may be shared with another tree, or the like.

With continued reference to FIG. 3, computing device 308 may build decision tree by following relational identification; for example, relational indication may specify that a first rule module receives an input from at least a second rule module and generates an output to at least a third rule module, and so forth, which may indicate to computing device 308 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 308 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 3, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 4:
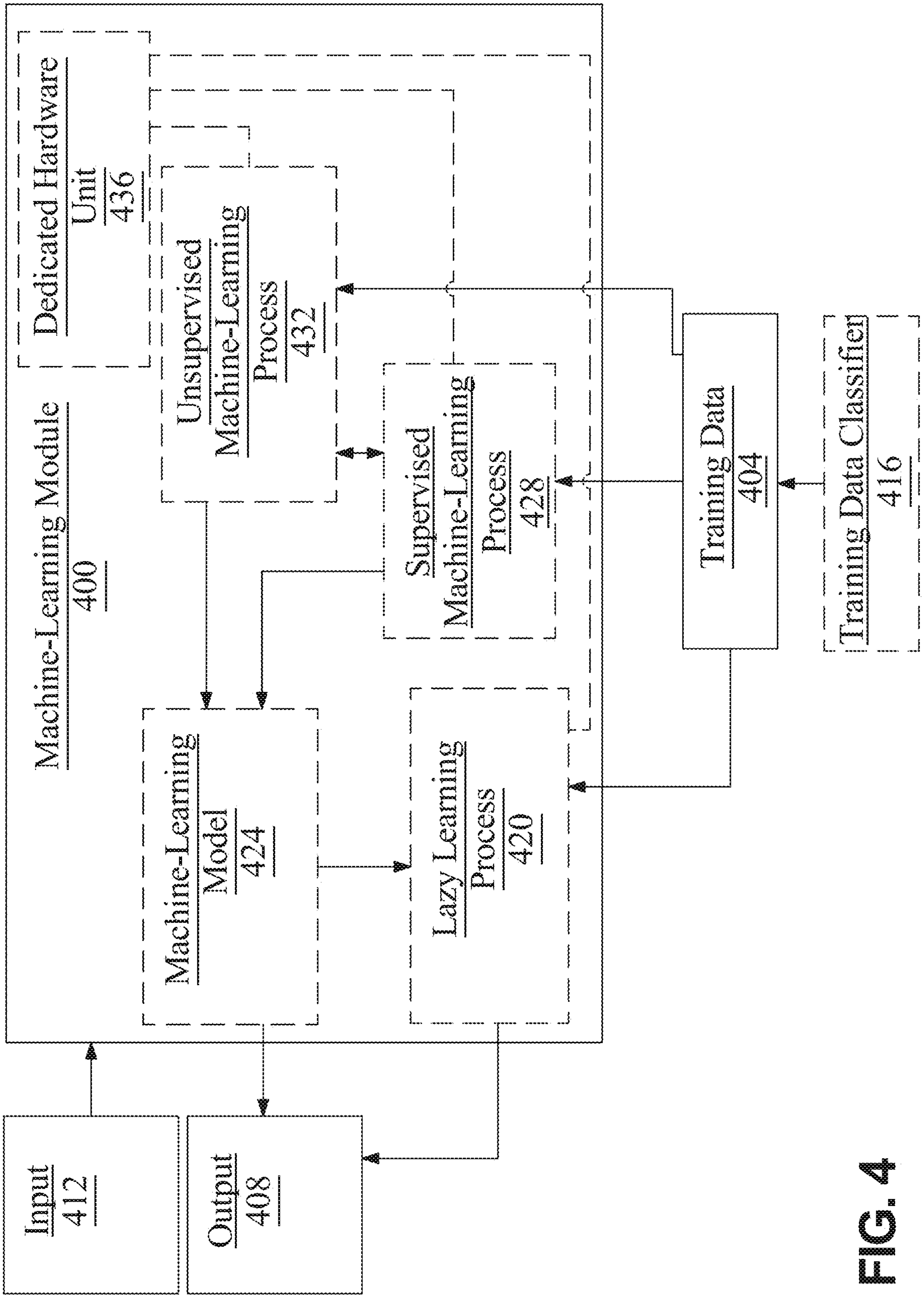
FIG. 4 illustrates a block diagram of an exemplary machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

With continued reference to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include AI generated datum, validated data, validation conditions, validation thresholds, confidence score, and the like. As a non-limiting illustrative example, output data may include validation conditions, validation thresholds, confidence score, validity of data, and the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to subject cohorts related to subject's demographic, medical condition, medical history, and the like.

With continued reference to FIG. 4, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine-learning model. Preprocessing may include sanitizing, feature selection, feature scaling, data augmentation and the like.

With continued reference to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine-learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine-learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine-learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

With continued reference to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include AI generated datum, validated data, validation conditions, validation thresholds, confidence score, and the like as described above as inputs, validation conditions, validation thresholds, confidence score, validity of data, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

With continued reference to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

With continued reference to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
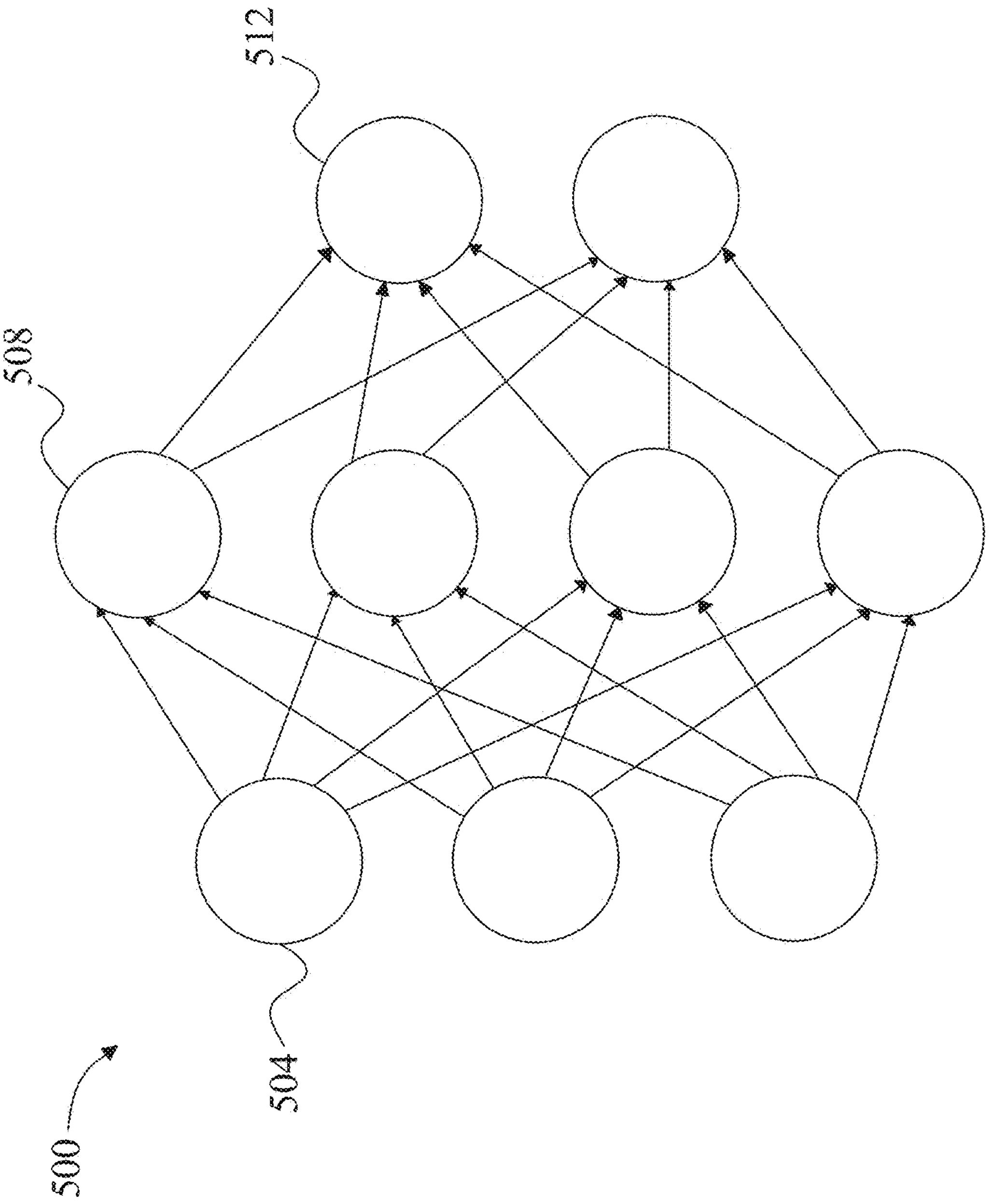
FIG. 5 illustrates a diagram of an exemplary neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
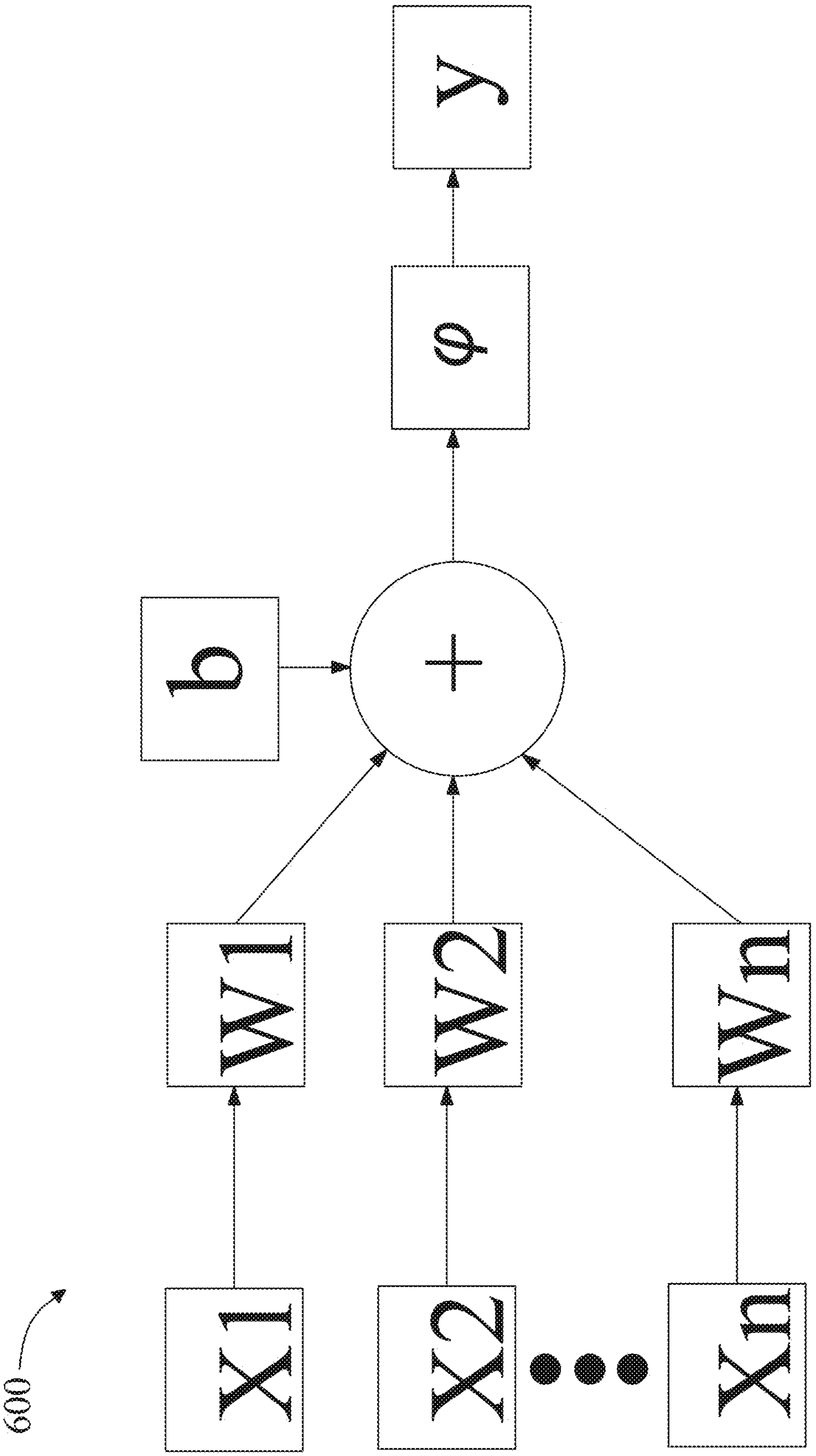
FIG. 6 illustrates a block diagram of an exemplary node in a neural network.

Referring now to FIG. 6 an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $$f(x) = a\left(1 + \tanh\left(\sqrt{2/\pi}\,(x + bx^r)\right)\right)$$

for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs xi that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
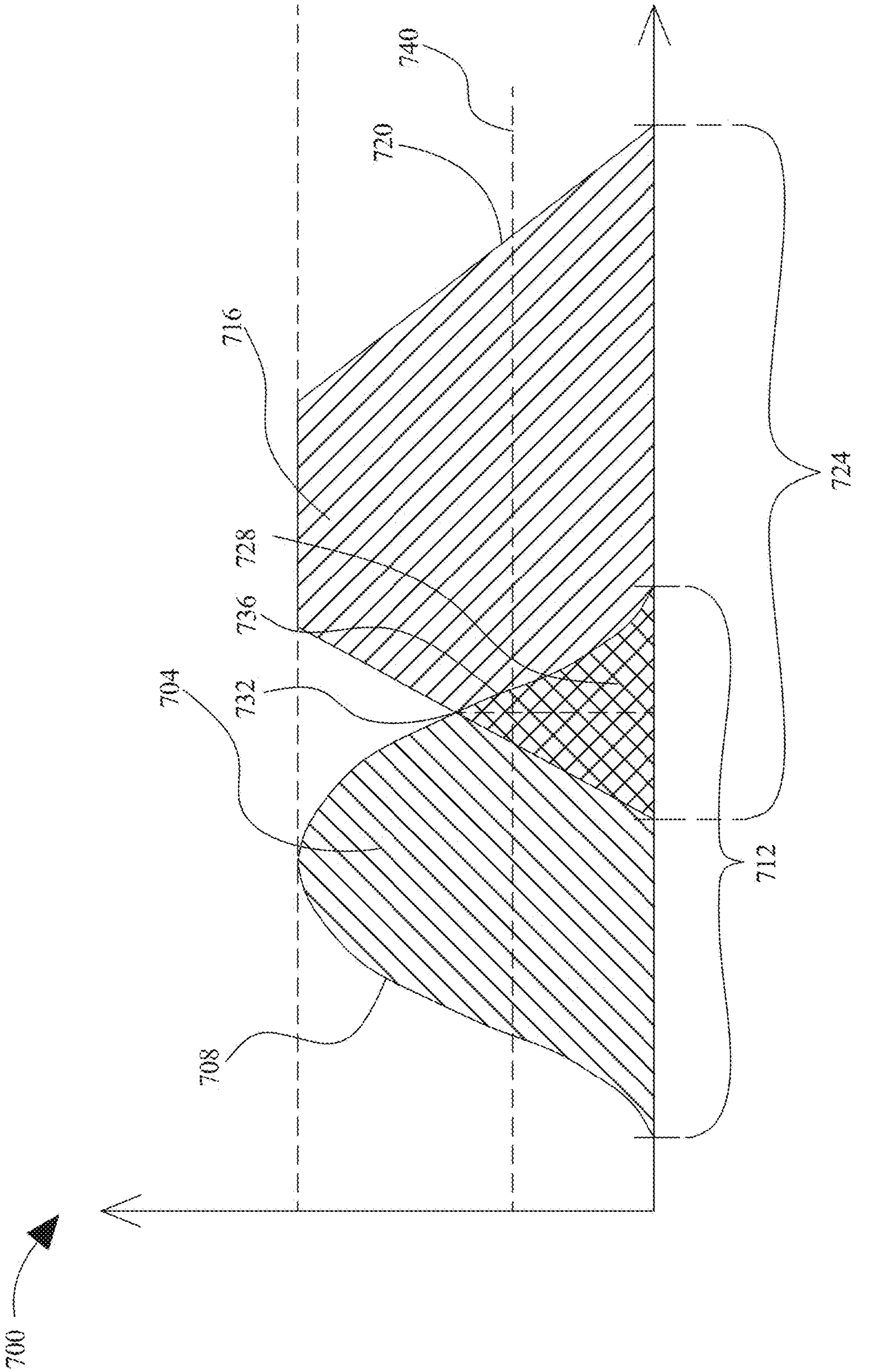
FIG. 7 illustrates an exemplary embodiment of fuzzy set comparison.

Referring to FIG. 7, an exemplary embodiment of fuzzy set comparison 700 is illustrated. A first fuzzy set 704 may be represented, without limitation, according to a first membership function 708 representing a probability that an input falling on a first range 712 of values is a member of the first fuzzy set 704, where the first membership function 708 has values on a range of probabilities such as without limitation the interval [0,1], and an area beneath the first membership function 708 may represent a set of values within first fuzzy set 704. Although first range 712 of values is illustrated for clarity in this exemplary depiction as a range on a single number line or axis, first range 712 of values may be defined on two or more dimensions, representing, for instance, a Cartesian product between a plurality of ranges, curves, axes, spaces, dimensions, or the like. First membership function 708 may include any suitable function mapping first range 712 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 7, first fuzzy set 704 may represent any value or combination of values as described above, including output from one or more machine-learning models, AI generated datum, and a predetermined class, such as without limitation of validity. A second fuzzy set 716, which may represent any value which may be represented by first fuzzy set 704, may be defined by a second membership function 720 on a second range 724; second range 724 may be identical and/or overlap with first range 712 and/or may be combined with first range via Cartesian product or the like to generate a mapping permitting evaluation overlap of first fuzzy set 704 and second fuzzy set 716. Where first fuzzy set 704 and second fuzzy set 716 have a region 728 that overlaps, first membership function 708 and second membership function 720 may intersect at a point 732 representing a probability, as defined on probability interval, of a match between first fuzzy set 704 and second fuzzy set 716. Alternatively or additionally, a single value of first and/or second fuzzy set may be located at a locus 736 on first range 712 and/or second range 724, where a probability of membership may be taken by evaluation of first membership function 708 and/or second membership function 720 at that range point. A probability at 728 and/or 732 may be compared to a threshold 740 to determine whether a positive match is indicated. Threshold 740 may, in a non-limiting example, represent a degree of match between first fuzzy set 704 and second fuzzy set 716, and/or single values therein with each other or with either set, which is sufficient for purposes of the matching process; for instance, threshold may indicate a sufficient degree of overlap between an output from one or more machine-learning models and/or AI generated datum and a predetermined class, such as without limitation validity categorization, for combination to occur as described above. Alternatively or additionally, each threshold may be tuned by a machine-learning and/or statistical process, for instance and without limitation as described in further detail below.

Further referring to FIG. 7, in an embodiment, a degree of match between fuzzy sets may be used to classify an AI generated datum with validity. For instance, if a validity has a fuzzy set matching AI generated datum fuzzy set by having a degree of overlap exceeding a threshold, processor may classify the AI generated datum as belonging to the validity categorization. Where multiple fuzzy matches are performed, degrees of match for each respective fuzzy set may be computed and aggregated through, for instance, addition, averaging, or the like, to determine an overall degree of match.

With continued reference to FIG. 7, in an embodiment, an AI generated datum may be compared to multiple validity categorization fuzzy sets. For instance, AI generated datum may be represented by a fuzzy set that is compared to each of the multiple validity categorization fuzzy sets; and a degree of overlap exceeding a threshold between the AI generated datum fuzzy set and any of the multiple validity categorization fuzzy sets may cause processor to classify the AI generated datum as belonging to validity categorization. For instance, in one embodiment there may be two validity categorization fuzzy sets, representing respectively validity categorization and an invalidity categorization. First validity categorization may have a first fuzzy set; Second validity categorization may have a second fuzzy set; and AI generated datum may have an AI generated datum fuzzy set. processor, for example, may compare an AI generated datum fuzzy set with each of validity categorization fuzzy set and invalidity categorization fuzzy set, as described above, and classify a AI generated datum to either, both, or neither of validity categorization or invalidity categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, AI generated datum may be used indirectly to determine a fuzzy set, as AI generated datum fuzzy set may be derived from outputs of one or more machine-learning models that take the AI generated datum directly or indirectly as inputs.

With continued reference to FIG. 7, a computing device may use a logic comparison program, such as, but not limited to, a fuzzy logic model to determine a validity response. An validity response may include, but is not limited to, numerical value or valid, invalid or unknown, and the like; each such validity response may be represented as a value for a linguistic variable representing validity response or in other words a fuzzy set as described above that corresponds to a degree of similarity with validated data as calculated using any statistical, machine-learning, or other method that may occur to a person skilled in the art upon reviewing the entirety of this disclosure. In other words, a given element of AI generated datum may have a first non-zero value for membership in a first linguistic variable value such as "valid" and a second non-zero value for membership in a second linguistic variable value such as "invalid." In some embodiments, determining a validity categorization may include using a linear regression model. A linear regression model may include a machine-learning model. A linear regression model may be configured to map data of AI generated datum, such as degree of similarity with validated data to one or more validity parameters. A linear regression model may be trained using a machine learning process. A linear regression model may map statistics such as, but not limited to, quality of AI generated datum similarity with validated data. In some embodiments, determining an validity of AI generated datum may include using a validity classification model. An validity classification model may be configured to input collected data and cluster data to a centroid based on, but not limited to, frequency of appearance, linguistic indicators of quality, and the like. Centroids may include scores assigned to them such that quality of similarity with validated data of AI generated datum may each be assigned a score. In some embodiments validity classification model may include a K-means clustering model. In some embodiments, validity classification model may include a particle swarm optimization model. In some embodiments, determining the validity of an AI generated datum may include using a fuzzy inference engine. A fuzzy inference engine may be configured to map one or more AI generated datum data elements using fuzzy logic. In some embodiments, AI generated datum may be arranged by a logic comparison program into validity arrangement. An "validity arrangement" as used in this disclosure is any grouping of objects and/or data based on skill level and/or output score. This step may be implemented as described above in FIGS. 1A-6. Membership function coefficients and/or constants as described above may be tuned according to classification and/or clustering algorithms. For instance, and without limitation, a clustering algorithm may determine a Gaussian or other distribution of questions about a centroid corresponding to a given similarity with validated data level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 7, an inference engine may be implemented according to input and/or output membership functions and/or linguistic variables. For instance, a first linguistic variable may represent a first measurable value pertaining to AI generated datum, such as a degree of similarity with validated data of an element, while a second membership function may indicate a degree of in validity of a subject thereof, or another measurable value pertaining to AI generated datum. Continuing the example, an output linguistic variable may represent, without limitation, a score value. An inference engine may combine rules, such as: "if the similarity level is 'high' and the accuracy level is 'high', the confidence score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 7, AI generated datum to be used may be selected by user selection, and/or by selection of a distribution of output scores, such as 70% valid, 30% invalid average, and 50% unknown, or the like. Each validity categorization may be selected using an additional function such as invalidity as described above.

Figure 8:
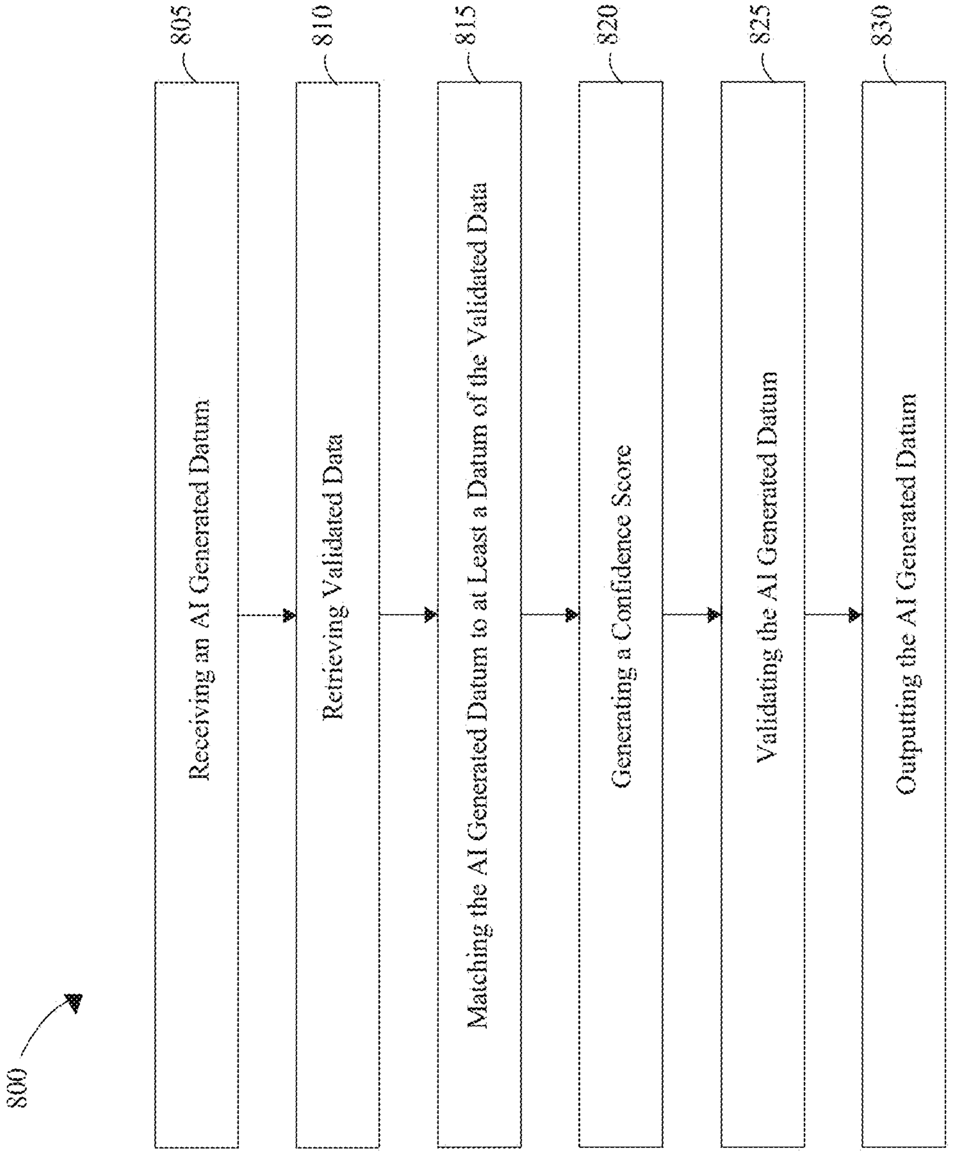
FIG. 8 illustrates a flow diagram illustrating an exemplary method for artificial intelligence (AI) generated datum validation.

Referring now to FIG. 8, a flow diagram illustrating an exemplary method 800 for artificial intelligence (AI) generated datum validation is disclosed. Method 800 contains a step 805 of receiving, using at least a processor, an AI generated datum, wherein the AI generated datum is generated using an AI model. In some embodiments, the AI generated datum may include a response generated for a question from a user using a large language model of the AI model. In some embodiments, the AI generated datum may be related to a treatment protocol for a diagnosis. These may be implemented as reference to FIGS. 1A-7.

With continued reference to FIG. 8, method 800 contains a step 810 of retrieving, using at least a processor, validated data from a validated database as a function of an AI generated datum, wherein the validated data is data that has been validated to meet validation conditions. In some embodiments, retrieving the validated data may include extracting a keyword from the AI generated datum, wherein the keyword may be classified into a keyword category, determining the validation conditions as a function of the keyword category by mapping the keyword category to the validation conditions and validating the AI generated datum as a function of the validation conditions. In some embodiments, retrieving the validated data may include classifying the AI generated datum into one or more subject cohorts as a function of subject data associated with the AI generated datum and retrieving the validated data as a function of the one or more subject cohorts. In some embodiments, retrieving the validated data may include retrieving the validated data from a validated database comprising a positive validation layer and a negative validation layer, wherein the positive validation layer is associated with the validated data and the negative validation layer is associated with data that are invalidated. In some embodiments, retrieving the validated data may include selecting a validation layer from among the positive validation layer and the negative validation layer and retrieving data from the selected validation layer. In some embodiments, retrieving the validated data may include identifying inconsistencies between the positive validation layer and the negative validation layer and transferring the validated data stored in the positive validation layer to the negative validation layer as a function of the inconsistencies. These may be implemented as reference to FIGS. 1A-7.

With continued reference to FIG. 8, method 800 contains a step 815 of matching, using at least a processor and a validation AI agent, an AI generated datum to at least a datum of validated data, wherein the validation AI agent is trained with validated training data, wherein the validated training data includes historical AI generated datum correlated to historical validated data and wherein matching the AI generated datum may include generating an embedding of the AI generated datum and comparing the embedding of the AI generated datum to one or more embeddings of validated data to identify at least a similar datum. These may be implemented as reference to FIGS. 1A-7.

With continued reference to FIG. 8, method 800 contains a step 820 of generating, using at least a processor and a validation AI agent, a confidence score of the AI generated datum based on the at least a similar datum. This may be implemented as reference to FIGS. 1A-7.

With continued reference to FIG. 8, method 800 contains a step 825 of validating, using at least a processor and a validation AI agent, an AI generated datum as a function of a confidence score. This may be implemented as reference to FIGS. 1A-7.

With continued reference to FIG. 8, method 800 contains a step 830 of outputting, using at least a processor, an AI generated datum based on a validation. In some embodiments, outputting the AI generated datum may further include generating a user interface including a graphical user interface comprising a visual element that is configured to indicate which of the validation conditions the AI generated datum meets. In some embodiments, outputting the AI generated datum may further include generating an alert when the AI generated datum is invalidated. These may be implemented as reference to FIGS. 1A-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
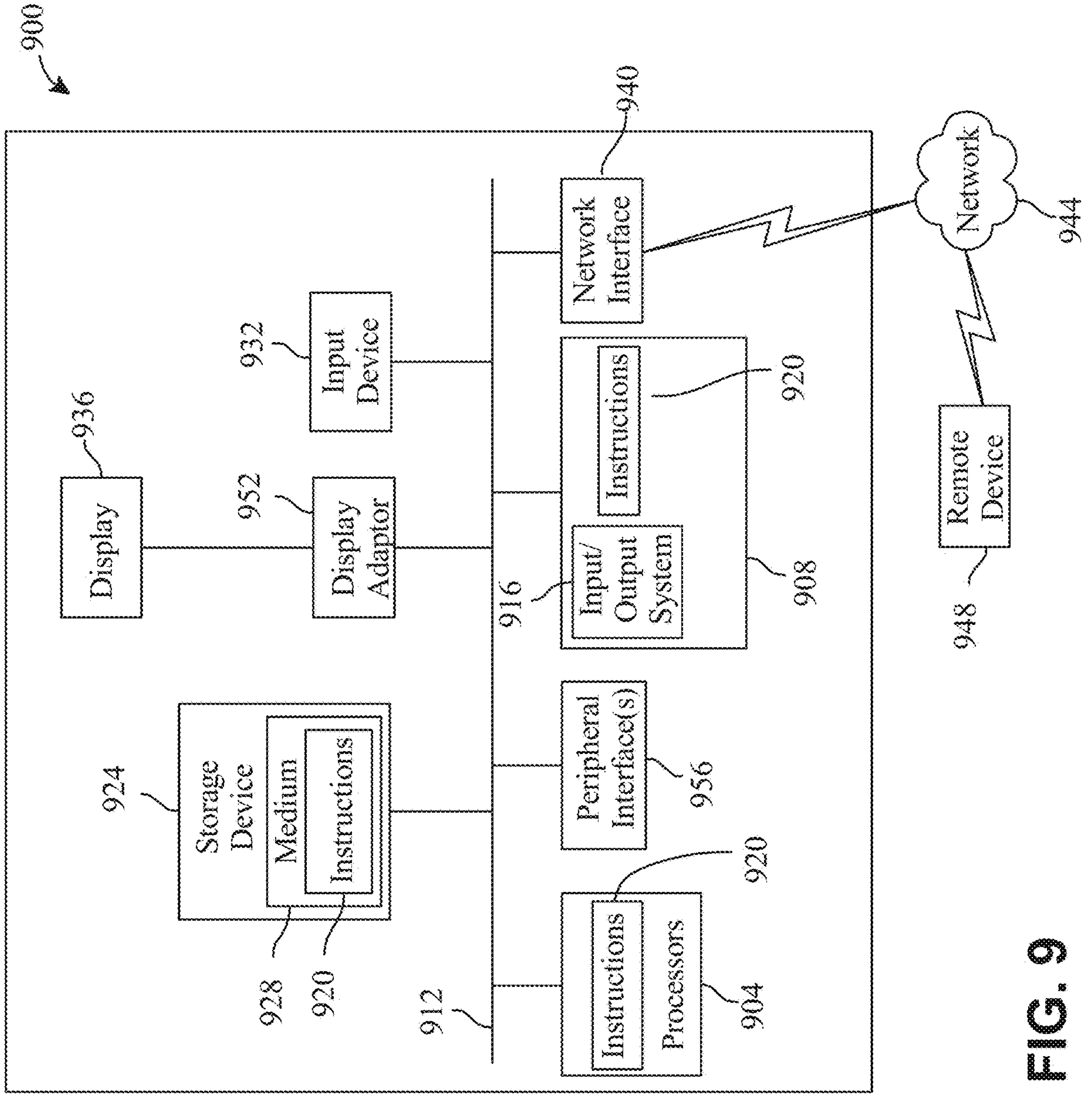
FIG. 9 illustrates a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and memory 908 that communicate with each other, and with other components, via a bus 912. Bus 912 may include any of several types of bus structures including, but not limited to, memory bus, memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display 936. Examples of a display device include, but are not limited to, a liquid crystal display (LCD), a cathode ray tube (CRT), a plasma display, a light emitting diode (LED) display, and any combinations thereof. Display adapter 952 and display 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for artificial intelligence (AI) generated datum validation, the apparatus comprising:
- at least a processor; and
- a memory communicatively connected to the at least a processor, wherein the memory contains instructions configuring the at least a processor to:
  - receive an AI generated datum, wherein the AI generated datum is generated using an AI model;
  - retrieve validated data from a validated database as a function of the AI generated datum, wherein the validated data is data that has been validated to meet validation conditions;
  - sanitize validated training data to reduce noise therein, wherein the validated training data comprises historical AI generated data correlated to historical validated data;
  - validate the AI generated datum as a function of the validated data using a validation AI agent, wherein the validation AI agent is trained with the sanitized validated training data;
  - use a large language model to output a response based on the validated AI generated datum, wherein the large language model employs an attention mechanism to detect relevant features before generating the output based on context vectors associated with a position of the historical AI generated data;
  - wherein the validation AI agent is configured to:
    - generate an embedding of the AI generated datum;
    - match the AI generated datum to at least a datum of the validated data, wherein matching comprises comparing the embedding of the AI generated datum to one or more embeddings of validated data to identify at least a similar datum;
    - generate a confidence score of the AI generated datum based on the at least a similar datum; and
    - validate the AI generated datum as a function of the confidence score;

modify at least one validation threshold stored in the validated database as a function of an identified confidence score patterns;

update the validated database as a function of the modified validation threshold;

initiate retraining of the AI model as a function of the modified validation threshold; and output the AI generated datum based on the validation.

2. The apparatus of claim 1, wherein the AI generated datum is related to a treatment protocol for a diagnosis.

3. The apparatus of claim 1, wherein retrieving the validated data comprises:

extracting a keyword from the AI generated datum, wherein the keyword is classified into a keyword category;

determining the validation conditions as a function of the keyword category by mapping the keyword category to the validation conditions; and validating the AI generated datum as a function of the validation conditions.

4. The apparatus of claim 1, wherein retrieving the validated data comprises:

classifying the AI generated datum into one or more subject cohorts as a function of subject data associated with the AI generated datum; and retrieving the validated data as a function of the one or more subject cohorts.

5. The apparatus of claim 1, wherein retrieving the validated data comprises retrieving the validated data from the validated database comprising a positive validation layer and a negative validation layer, wherein the positive validation layer is associated with the validated data and the negative validation layer is associated with data that are invalidated.

6. The apparatus of claim 5, wherein retrieving the validated data comprises selecting a validation layer from among the positive validation layer and the negative validation layer as a function of a validation requirement of the AI generated datum and retrieving data from the selected validation layer.

7. The apparatus of claim 5, wherein retrieving the validated data comprises:

identifying inconsistencies between the positive validation layer and the negative validation layer; and transferring the validated data stored in the positive validation layer to the negative validation layer as a function of the inconsistencies.

8. The apparatus of claim 1, wherein outputting the AI generated datum further comprises generating a user interface comprising a graphical user interface comprising a visual element that is configured to indicate which of the validation conditions the AI generated datum meets.

9. The apparatus of claim 1, wherein outputting the AI generated datum further comprises generating an alert when the AI generated datum is invalidated.

10. A method for artificial intelligence (AI) generated datum validation, the method comprising:

receiving, using at least a processor, an AI generated datum, wherein the AI generated datum is generated using an AI model;

retrieving, using the at least a processor, validated data from a validated database as a function of the AI generated datum, wherein the validated data is data that has been validated to meet validation conditions;

sanitizing, using the at least a processor, validated training data to reduce noise therein, wherein the validated training data comprises historical AI generated data correlated to historical validated data;

matching, using the at least a processor and a validation AI agent, the AI generated datum to at least a datum of the validated data, wherein the validation AI agent is trained with the sanitized validated training data;

outputting, using a large language model, a response based on the validated AI generated datum, wherein the large language model employs an attention mechanism to detect relevant features before generating the output based on context vectors associated with a position of the historical AI generated data; and wherein matching the AI generated datum comprises:

generating an embedding of the AI generated datum; and comparing the embedding of the AI generated datum to one or more embeddings of validated data to identify at least a similar datum;

generating, using the at least a processor and the validation AI agent, a confidence score of the AI generated datum based on the at least a similar datum;

validating, using the at least a processor and the validation AI agent, the AI generated datum as a function of the confidence score;

modifying, using the at least a processor, at least one validation threshold stored in the validated database as a function of an identified confidence score patterns;

updating, using the at least a processor, the validated database as a function of the modified validation threshold;

initiating, using the at least a processor, retraining of the AI model as a function of the modified validation threshold; and outputting, using the at least a processor, the AI generated datum based on the validation.

11. The method of claim 10, wherein the AI generated datum is related to a treatment protocol for a diagnosis.

12. The method of claim 10, wherein retrieving the validated data comprises:

extracting a keyword from the AI generated datum, wherein the keyword is classified into a keyword category;

determining the validation conditions as a function of the keyword category by mapping the keyword category to the validation conditions; and validating the AI generated datum as a function of the validation conditions.

13. The method of claim 10, wherein retrieving the validated data comprises:

classifying the AI generated datum into one or more subject cohorts as a function of subject data associated with the AI generated datum; and retrieving the validated data as a function of the one or more subject cohorts.

14. The method of claim 10, wherein retrieving the validated data comprises retrieving the validated data from the validated database comprising a positive validation layer and a negative validation layer, wherein the positive validation layer is associated with the validated data and the negative validation layer is associated with data that are invalidated.

15. The method of claim 14, wherein retrieving the validated data comprises selecting a validation layer from among the positive validation layer and the negative validation layer as a function of a validation requirement of the AI generated datum and retrieving data from the selected validation layer.

16. The method of claim 14, wherein retrieving the validated data comprises:

identifying inconsistencies between the positive validation layer and the negative validation layer; and transferring the validated data stored in the positive validation layer to the negative validation layer as a function of the inconsistencies.

17. The method of claim 10, wherein outputting the AI generated datum further comprises generating a user interface comprising a graphical user interface comprising a visual element that is configured to indicate which of the validation conditions the AI generated datum meets.

18. The method of claim 10, wherein outputting the AI generated datum further comprises generating an alert when the AI generated datum is invalidated.

* * * * *